United States Patent
Kawashima et al.

(10) Patent No.: US 9,514,772 B2
(45) Date of Patent: Dec. 6, 2016

(54) MAGNETIC HEAD DEVICE HAVING SUSPENSION AND SPACER

(71) Applicant: TDK CORPORATION, Tokyo (JP)

(72) Inventors: Takashi Kawashima, Tokyo (JP); Toru Mizuno, Tokyo (JP); Katsuhiko Igarashi, Tokyo (JP); Makoto Orikasa, Tokyo (JP); Hidetoshi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/071,881

(22) Filed: Mar. 16, 2016

(65) Prior Publication Data

US 2016/0275975 A1 Sep. 22, 2016

(30) Foreign Application Priority Data

Mar. 20, 2015 (JP) .................................. 2015-058496
Mar. 20, 2015 (JP) .................................. 2015-058498

(51) Int. Cl.
*G11B 5/48* (2006.01)
*G11B 5/60* (2006.01)

(52) U.S. Cl.
CPC ........... *G11B 5/4833* (2013.01); *G11B 5/6005* (2013.01); *G11B 5/4813* (2013.01)

(58) Field of Classification Search
CPC .. G11B 5/4813; G11B 5/4833; G11B 5/6005
See application file for complete search history.

(56) References Cited

U.S. PATENT DOCUMENTS

| | | | | |
|---|---|---|---|---|
| 5,282,103 A * | 1/1994 | Hatch | ................... | G11B 5/4833 360/244.2 |
| 5,759,418 A * | 6/1998 | Frater | .................... | G11B 21/16 216/22 |
| 5,841,609 A * | 11/1998 | Tochiyama | .......... | G11B 5/4833 360/244.7 |
| 6,172,852 B1 * | 1/2001 | Boutaghou | .......... | G11B 5/4833 360/244.5 |
| 6,215,625 B1 * | 4/2001 | Carlson | ................ | G11B 5/4826 360/244.7 |
| 6,406,636 B1 * | 6/2002 | Vaganov | .............. | B23K 1/0016 216/2 |
| 6,477,017 B2 * | 11/2002 | Kohei | .................... | G11B 5/488 360/265.9 |
| 6,704,165 B2 * | 3/2004 | Kube | .................... | G11B 5/4853 360/245.4 |
| 6,865,058 B2 * | 3/2005 | Kube | .................... | G11B 5/4833 360/244.5 |
| 6,956,720 B2 * | 10/2005 | Takagi | ................. | G11B 5/4813 360/244.6 |
| 6,970,326 B2 * | 11/2005 | Watanabe | ............ | G11B 5/4833 360/244.1 |
| 7,688,551 B2 * | 3/2010 | Kido | .................... | G11B 5/4826 360/244.8 |
| 8,233,243 B2 * | 7/2012 | Zhu | ....................... | G11B 5/4826 360/244.2 |
| 8,842,393 B2 * | 9/2014 | Kawatake | ............ | G11B 5/4833 360/294.3 |
| 2011/0151176 A1 * | 6/2011 | Akiyama | ............ | H01L 21/6835 428/78 |
| 2015/0121692 A1 * | 5/2015 | Eifuku | .................... | H01L 24/16 29/840 |

FOREIGN PATENT DOCUMENTS

JP H05-303855 A 11/1993
JP H07-178582 A 7/1995

* cited by examiner

*Primary Examiner* — Brian Miller
(74) *Attorney, Agent, or Firm* — Oliff PLC

(57) ABSTRACT

A magnetic head device which has strong joint strength in an arm and a suspension and high accuracy of a size and a shape is provided. The magnetic head device comprises an arm, a suspension overlapping with a leading end part of the arm, a slider located at a leading end part of the suspension, and a first joint part that is placed between the leading end part of the arm and the suspension and that joins the arm and the suspension, the first joint part including Sn or a resin adhesive.

4 Claims, 23 Drawing Sheets

MAGNETIC HEAD DEVICE HAVING SUSPENSION AND SPACER

TECHNICAL FIELD

The present invention relates to a magnetic head device.

BACKGROUND

In a magnetic disk device, a head stack assembly (HSA) performs reading/writing of magnetic record. The HSA comprises, for example, a carriage having a plurality of arms and a head gimbal assembly (HGA) joined to each arm. The HGA has a suspension joined to a leading end part of each arm, and a slider located at a leading end part of the suspension. A magnetic head (such as thin-film magnetic head) is embedded in the slider. A carriage (E-shaped carriage) having a plurality of arms may be referred to as an E-block.

In a related art, fitting and joining disclosed in Japanese Unexamined Patent Publication No. H5-303855 has been known as a method of joining an arm and a suspension. In the method disclosed in Japanese Unexamined Patent Publication No. H5-303855, a flange is formed on the suspension and a fitting hole is formed in the arm. A position of the flange and a position of the fitting hole are aligned and the flange of the suspension is fitted into the fitting hole of the arm. Then, a metal ball is introduced by a pressurization shaft from a hole of the flange and the metal ball goes through the each hole. A diameter of the metal ball is larger than the minimum diameter of the hole of the flange. Thus, the flange of the suspension is pushed and bent by the metal ball and the flange is pressed against the arm. That is, swaging (or caulking) is performed. With these procedures, the arm and the suspension are joined to each other.

In addition, a joining method other than fitting and joining is also known. For example, in Japanese Unexamined Patent Publication No. H7-178582, a method of joining a suspension and an arm by irradiation of a joining beam (by YAG laser) is disclosed.

SUMMARY

To increase a storage capacity of a magnetic disk device, it is necessary to increase the number of magnetic disks mounted to the device. However, there is a limit in a size (height) of the magnetic disk device. Thus, to increase the number of magnetic disks, it is necessary to make an arm, a suspension, and a joint part thereof thin, to narrow down an interval between the arm and the suspension, and to increase a space to install the magnetic disks.

In a case of fitting and joining disclosed in Japanese Unexamined Patent Publication No. H5-303855, a fitting range (joint part) becomes smaller and joint strength becomes lower as the arm and the suspension become thinner. That is, when the arm and the suspension become thinner, each fitting hole becomes shallower and the joint strength is decreased. Along with a decrease in the joint strength, a position of a magnetic head becomes unstable and accurate reading/writing of magnetic record becomes difficult. In the worst case, the suspension is detached from the arm and dropped onto the magnetic disk and the magnetic disk is damaged.

Also, in a case of joining by utilization of a laser disclosed in Japanese Unexamined Patent Publication No. H7-178582, an arm and a suspension are welded in a spot of a laser. Since a size of the spot is limited, a joint area (joint part) becomes small and adequate and reliable joint strength cannot be acquired. Also, when a space between suspensions becomes small along with an increase of the number of magnetic disks, it becomes difficult to accurately irradiate an intended position with a laser. As a result, adequate and reliable joint strength cannot be acquired.

In order to solve the above, inventors of the present invention found that joint strength in an arm and a suspension is increased when a surface of the arm and a surface of the suspension are joined to each other via a Sn (tin) elementary substance or an alloy including Sn (Sn-based alloy). Also, the inventors found that joint strength in an arm and a suspension is increased when a surface of the arm and a surface of the suspension are adhered to each other with a resin adhesive. An arm and a suspension are joined to each other with any of Sn, a Sn-based alloy, and a resin adhesive by surface contact. Thus, even when the arm and the suspension are thin, high joint strength is realized.

However, the inventors found that the following problem is generated when an arm and a suspension are joined to each other with any of Sn, a Sn-based alloy, and a resin adhesive.

When a surface of an arm and a surface of a suspension are joined to each other via Sn or a Sn-based alloy, melted Sn or the melted Sn-based alloy (melted metal) flows and protrudes from between the arm and the suspension and easily forms a fillet. A large fillet impairs accuracy of a size and a shape of a HSA. For example, a through-hole (positioning hole) is formed in each of the arm and the suspension and positions of the through-holes are adjusted, whereby the arm and the suspension are positioned. However, when a fillet is formed in each of these through-holes, accuracy of a size of the positioning holes is impaired and it becomes difficult to position the arm and the suspension accurately. Even when a surface of the arm and a surface of the suspension are adhered to each other with a resin adhesive, an uncured resin adhesive easily flows and protrudes from between the arm and the suspension. When the resin adhesive protrudes too much, the resin adhesive impairs accuracy of a size and a shape of a HSA similarly to a fillet. In the following, the resin adhesive that protrudes from between the arm and the suspension is also referred to as a "fillet" for convenience.

Along with downsizing of a magnetic disk device and an increase in the number of magnetic disks, a size and a shape of a HSA installed to a magnetic disk device is limited strictly. Thus, it is necessary to improve accuracy of the size/shape of the HSA by suppressing formation or growth of the fillet.

In view of the circumstances mentioned above, it is an object of the present invention to provide a magnetic head device that has strong joint strength in an arm and a suspension and high accuracy of a size and a shape.

First Aspect of Present Invention

A magnetic head device according to the first aspect of the present invention comprises an arm; a suspension overlapping with a leading end part of the arm; a slider located a leading end part of the suspension; and a first joint part that is located between the leading end part of the arm and the suspension and that joins the arm and the suspension, while the first joint part includes Sn or a resin adhesive, an arm-side joint surface is defined as a surface of the arm which surface faces the suspension, a suspension-side joint surface is defined as a surface of the suspension which surface faces the arm, at least one of the arm-side joint surface and the suspension-side joint surface includes a first overlapped region that overlaps with the other joint surface and a first non-overlapped region that does not overlap with the other joint surface, the first joint part is in contact with both of the arm and the suspension in the first overlapped region, and a part of the first joint part extends to at least a part of the first non-overlapped region.

In the first aspect of the present invention, the first joint part may include an alloy containing Sn, and the alloy may contain at least one kind selected from the group consisting of silver (Ag), copper (Cu), bismuth (Bi), indium (In), nickel (Ni), zinc (Zn), phosphorus (P), and gold (Au).

In the first aspect of the present invention, the suspension may include a spacer that overlaps with the leading end part of the arm and that is joined to the arm by the first joint part, a load beam, one leading end part of which overlaps with the spacer and the slider is located at the other leading end part of which, and a second joint part that is located between the spacer and the load beam and that joins the spacer and the load beam, while the second joint part includes Sn or a resin adhesive, a spacer-side joint surface is defined as a surface of the spacer which surface faces the load beam, a load beam-side joint surface is defined as a surface of the load beam which surface faces the spacer, at least one of the spacer-side joint surface and the load beam-side joint surface may include a second overlapped region that overlaps with the other joint surface and a second non-overlapped region that does not overlap with the other joint surface, and the second joint part may be in contact with both of the spacer and the load beam in the second overlapped region, and a part of the joint part may extend to at least a part of the second non-overlapped region.

In the first aspect of the present invention, the second joint part may include an alloy containing Sn, and the alloy may contain at least one kind selected from the group consisting of Ag, Cu, Bi, In, Ni, Zn, P, and Au.

In the first aspect of the present invention, the suspension may include a spacer that overlaps with the leading end part of the arm and that is joined to the arm by the first joint part, and a load beam, one leading end part of which overlaps with the spacer and the slider is located in the other leading end part of which, while the spacer and the load beam may be directly welded.

The magnetic head device according to the first aspect of the present invention may comprise a carriage having a plurality of arms.

Second Aspect of the Present Invention

A magnetic head device according to the second aspect of the present invention comprises an arm; a suspension overlapping with a leading end part of the arm; a slider located at a leading end part of the suspension; and a first joint part that is located between the leading end part of the arm and the suspension and that joins the arm and the suspension, while the first joint part includes Sn or a resin adhesive, an arm-side joint surface is defined as a part of a surface of the arm which part overlaps with the suspension, a suspension-side joint surface is defined as a part of a surface of the suspension which part overlaps with the arm, a first concave portion (a first depressed portion) is formed in at least one of the arm-side joint surface and the suspension-side joint surface, and a part of the first joint part extends into the first concave portion.

In the second aspect of the present invention, the first joint part may include an alloy containing Sn, and the alloy may contain at least one kind selected from the group consisting of silver (Ag), copper (Cu), bismuth (Bi), indium (In), nickel (Ni), zinc (Zn), phosphorus (P), and gold (Au).

In the second aspect of the present invention, the first concave portion may penetrate the arm or the suspension.

In the second aspect of the present invention, the suspension may include a spacer that overlaps with the leading end part of the arm and that is joined to the arm by the first joint part, a load beam, one leading end part of which overlaps with the spacer and the slider is located at the other leading end part of which, and a second joint part that is located between the spacer and the load beam and that joins the spacer and the load beam, while the second joint part includes Sn or a resin adhesive, a spacer-side joint surface is defined as a part of a surface of the spacer which part overlaps with the load beam, a load beam-side joint surface is defined as a part of a surface of the load beam which part overlaps with the spacer, a second concave portion (a second depressed portion) is formed in at least one of the spacer-side joint surface and the load beam-side joint surface, and a part of the second joint part may extends into the second concave portion.

In the second aspect of the present invention, the second joint part may include an alloy containing Sn, and the alloy may contain at least one kind selected from the group consisting of Ag, Cu, Bi, In, Ni, Zn, P, and Au.

In the second aspect of the present invention, the second concave portion may penetrate the spacer or the load beam.

In the second aspect of the present invention, the suspension may include a spacer that overlaps with the leading end part of the arm and that is joined to the arm by the first joint part, and a load beam, one leading end part of which overlaps with the spacer and the slider is located at the other leading end part of which, while the spacer and the load beam may be directly welded.

The magnetic head device according to the second aspect of the present invention may comprise a carriage having a plurality of arms.

According to an aspect of the present invention, a magnetic head device that has strong joint strength in an arm and a suspension and high accuracy of a size and a shape is provided.

DETAILED DESCRIPTION

Figure 1:
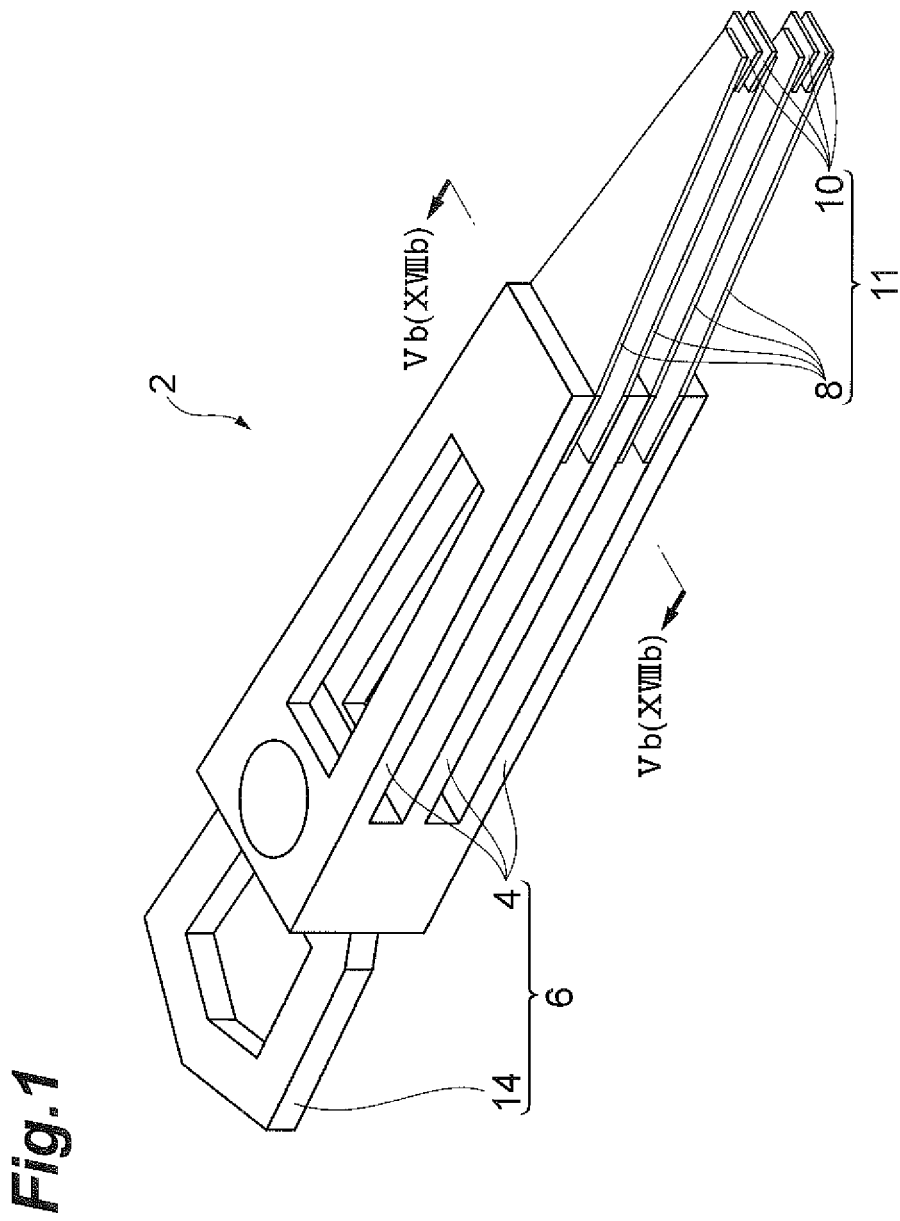
FIG. 1 is a schematic perspective view of a magnetic head device according to a first or eighth embodiment of the present invention.

[First Aspect of the Present Invention] In the following, each embodiment of a first aspect of the present invention will be described with reference to FIGS. 1 to 16B. The following first to seventh embodiments are detailed examples of the first aspect of the present invention. In FIGS. 1 to 16B, the same reference sign is assigned to the same or similar configurations. The first aspect of the present invention is not limited to the following embodiments.

(First Embodiment) A magnetic head device according to the first embodiment is a head stack assembly (HSA). As illustrated in FIG. 1, FIG. 2, FIG. 3, and FIG. 4, a HSA 2 comprises a carriage 6 having a plurality of arms 4, suspensions 8 respectively overlapping with leading end parts of the arms 4, sliders 10 respectively located at the leading end parts of the suspensions 8, a first joint part 12 that is located between the leading end part of each arm 4 and each suspension 8 and that joins the arm 4 and the suspension 8. In other words, the HSA 2 comprises the carriage 6 having the plurality of arms 4, head gimbal assemblies (HGA 11) respectively joined to the leading end parts of the arms 4, and the first joint part 12 joining each arm 4 and each HGA 11. Each of the arms 4 and suspensions 8 may be flat or plate-shaped. Each of the arms 4 and suspensions 8 may be extended in a predetermined direction. That is, each of the arms 4 and suspensions 8 may be elongated. Each of the suspensions 8 may overlap only with one surface of a leading end part of one arm 4. One suspension 8 may overlap with a surface of a leading end part of one arm 4 and another suspension 8 may overlap with a rear surface of the leading end part of the arm 4. That is, a leading end part of one arm 4 may be sandwiched by a pair of suspensions 8. A magnetic head (such as thin-film magnetic head) is embedded in each slider 10. The plurality of arms 4 and HGAs 11 are overlapped with each other in the same direction with predetermined intervals. For convenience of description, three arms 4 are illustrated. However, the number of arms 4 is not limited. For convenience of description, four suspensions 8 and four sliders 10 are illustrated. However, the number of suspensions 8 and that of sliders 10 are not limited.

The HSA 2 is mounted in a magnetic disk (HDD) comprising a plurality of magnetic disks 16. The plurality of magnetic disks 16 are attached to a spindle motor 20 and overlapped with each other with predetermined intervals. Each of the magnetic disks 16 may be arranged between a pair of HGAs 11. Each slider 10 located at a leading end part of each HGA 11 faces the magnetic disk 16. A part of the carriage 6 which part is located on an opposite side of each arm 4 is a coil part 14. The coil part 14 and a pair of permanent magnets 22 which sandwich and face the coil part 14 constitute a voice coil motor (VCM). For convenience of description, two magnetic disks 16 are illustrated. However, the number of magnetic disks 16 is not limited.

A first joint part 12 includes Sn or a resin adhesive. The first joint part 12 includes one of Sn or a resin adhesive. The first joint part 12 may include a Sn elementary substance. The first joint part 12 may consist only of a Sn elementary substance. The first joint part 12 may include an alloy containing Sn. The first joint part 12 may consist only of an alloy containing Sn. The alloy containing Sn may contain at least one kind selected from the group consisting of Ag, Cu, Bi, In, Ni, Zn, P, and Au. In the following, the alloy containing Sn may be referred to as an "Sn-based alloy." A resin adhesive included in the first joint part 12 means an already-cured resin adhesive. The first joint part 12 may consist only of a cured resin adhesive. The resin adhesive may be, for example, a thermosetting resin. The thermosetting resin may be, for example, an epoxy resin or a phenolic resin.

A substance composing an arm 4 (basis material of arm 4) is not specifically limited but may be, for example, aluminum (Al). A part or a whole of a surface of the alum 4 may be a protective layer consisting of Ni—P (Ni including phosphorus). That is, the arm 4 may have a substrate (basis material) consisting of Al or the like, and a protective layer covering a part or a whole of a surface of the substrate. The first joint part 12 may be located on the protective layer constituting the surface of the arm 4. A substance composing the whole carriage 6 (except for coil part 14) may be the same with the substance composing the arm 4. A part or a whole of the surface of the carriage 6 (except for coil part 14) may be the protective layer. A substance composing the suspension 8 (basis material of suspension 8) is not specifically limited but may be, for example, stainless steel (SUS).

Figure 5A:
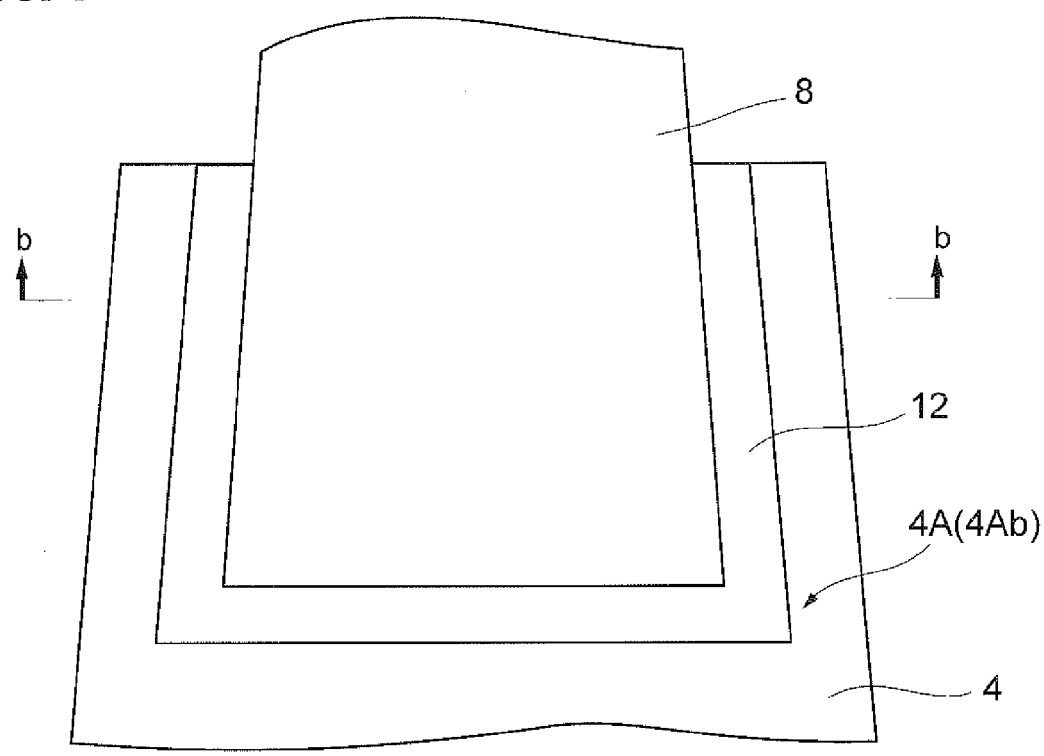
FIG. 5A is a schematic top view that is related to the first aspect of the present invention and that illustrates a leading end of an arm and a suspension illustrated in FIG. 1.
Figure 5B:
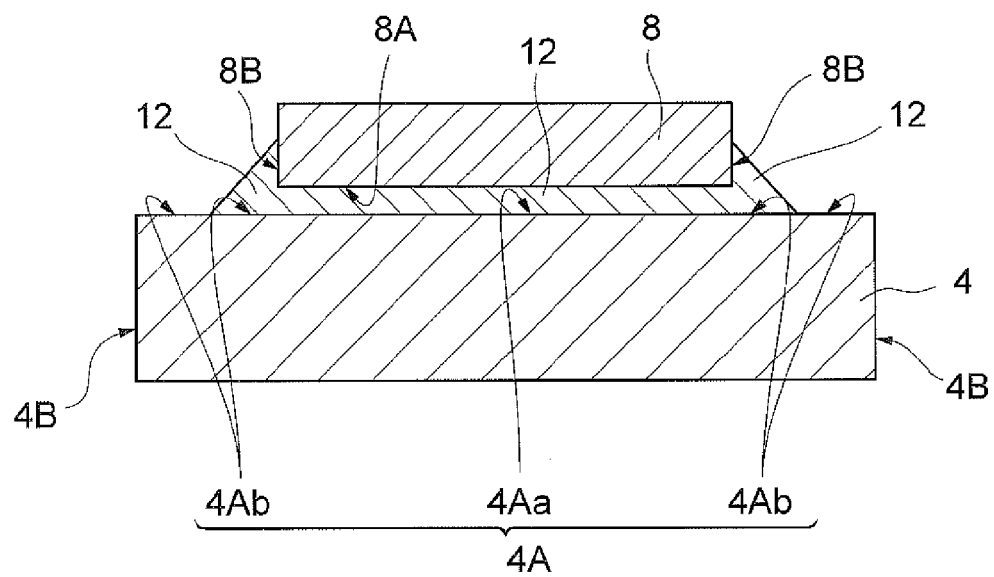
FIG. 5B is a schematic cross sectional view that is related to the first aspect of the present invention and that illustrates the arm, the first joint part, and the suspension in a b-b line in FIG. 5A.

With reference to FIG. 5B, the first joint part 12 will be described in detail. Note that a cross section illustrated in FIG. 5B corresponds to a cross section in a direction of a Vb-Vb line in FIG. 1. However, a vertical relationship between the arm 4 and the suspension 8 in FIG. 5B is not necessarily identical to a vertical relationship between the arm 4 and the suspension 8 in the cross section in the direction of the Vb-Vb line in FIG. 1. Also, a vertical relationship between the arm 4 and the suspension 8 in each of FIG. 7B, FIG. 9, FIG. 11, FIG. 13, and FIG. 14B described later also corresponds to the cross section in a direction of the Vb-Vb line in FIG. 1. However, a vertical relationship between an arm 4 and a suspension 8 in each drawing is not necessarily identical to the vertical relationship between the arm 4 and the suspension 8 in the cross section in the direction of the Vb-Vb line in FIG. 1.

As illustrated in FIG. 5B, an arm-side joint surface 4A is defined as a surface of the arm 4 which surface faces the suspension 8. A suspension-side joint surface 8A is defined as a surface of the suspension 8 which surface faces the arm 4. The arm-side joint surface 4A between the arm-side joint surface 4A and the suspension-side joint surface 8A includes a first overlapped region 4Aa that overlaps with the suspension-side joint surface 8A and a first non-overlapped region 4Ab that is not overlapped with the suspension-side joint surface 8A. The whole suspension-side joint surface 8A is overlapped with a surface of the arm 4. On a cross section vertical to a direction in which the arm 4 and the suspension 8 extend (longitudinal direction), a width of the arm 4 is wider than that of the suspension 8. In other words, a width in a transverse direction (short direction) of the arm 4 is wider than that of the suspension 8. The first joint part 12 is in contact with both of the arm 4 and the suspension 8 in the first overlapped region 4Aa. A part of the first joint part 12 extends to at least a part of the first non-overlapped region 4Ab. In other words, the part of the first joint part 12 covers at least a part of the first non-overlapped region 4Ab. That is, a first joint part 12 (fillet) that protrudes from between the arm 4 and the suspension 8 is spread at least to a part of the first non-overlapped region 4Ab. The part of the first joint part 12 may extend to a whole first non-overlapped region 4Ab.

A part of the first joint part 12 covers a part of a side surface 8B of the suspension 8 which surface is substantially vertical to the first non-overlapped region 4Ab. In other words, the part of the first joint part 12 extends to the part of the side surface 8B of the suspension 8 which surface is substantially vertical to the first non-overlapped region 4Ab. That is, the part of the first joint part 12 covers the part of the side surface 8B of the suspension 8 which surface shares one side with the suspension-side joint surface 8A. In other words, the first joint part 12 (fillet) that protrudes from between the arm 4 and the suspension 8 is spread to a part of the side surface 8B of the suspension 8 which surface is adjacent to the suspension-side joint surface 8A.

The first joint part 12 (fillet) protruding from between the arm 4 and the suspension 8 is located on an inner side of an outer periphery of the first non-overlapped region 4Ab and the first joint part 12 (fillet) is formed along a groove between the arm-side joint surface 4A and the side surface 8B of the suspension 8 which surface is substantially vertical to the joint surface. In other words, the fillet is formed along an outer periphery of the suspension 8 or along an outer periphery of the suspension-side joint surface 8A.

The HSA 2 according to the first embodiment may be produced by a production method comprising the undermentioned first step and a second step following the first step. In the following, a production method in case of the first joint part 12 includes Sn will be described.

In the first step, at least one of the arm-side joint surface 4A and the suspension-side joint surface 8A may be covered with a Sn-based alloy or a Sn elementary substance. In other words, in the first step, a film including Sn is formed at least on one of the arm-side joint surface 4A and the suspension-side joint surface 8A. In the first step, at least one of a whole surface of the arm 4 and a whole surface of the suspension 8 may be covered with a Sn-based alloy or a Sn elementary substance. That is, in the first step, the whole surface of the arm 4 may be covered with a film including Sn and the whole surface of the suspension 8 may be covered with a film including Sn. In the following, a film formed on the surface of the arm 4 in the first step will be referred to as an "arm film." Also, a film formed on the surface of the suspensions 8 in the first step will be referred to as a "suspension film." Composition of the first joint part 12 can be controlled, for example, by adjustment of composition of the arm film or the suspension film. At least one of the arm film and the suspension film includes Sn. When there is an arm film including Sn, a suspension film may be absent. When there is a suspension film including Sn, an arm film may be absent. In the first step, the arm film may be formed on the protective layer constituting the surface of the arm 4.

A method of forming the arm film and the suspension film may be, for example, plating, sputtering, or chemical vapor deposition (CVD). The plating may be either one of electrolytic plating or electroless plating. According to these forming methods, it is possible to freely adjust composition and a thickness of each of the arm film and the suspension film. Only a part of the surface of the arm 4 (such as arm-side joint surface 4A) may be exposed and the other part thereof may be covered by a masking process performed before the first step. In the first step after the masking process, the arm film may be formed only on the exposed part on the surface of the arm 4 (such as arm-side joint surface 4A). Only a part of the surface of the suspension 8 (such as suspension-side joint surface 8A) may be exposed and the other part thereof may be covered by a masking process performed before the first step. In the first step after the masking process, the suspension film may be formed only on the exposed part on the surface of the suspension 8 (such as suspension-side joint surface 8A). In the masking process, the arm 4 or the suspension 8 may be covered with a resin film. That is, a mask may be a resin film. The resin film used in the masking process is different from the resin adhesive included in the first joint part 12. In the first step, a basis material of the arm 4 may be exposed on a surface (side surface 4B) adjacent to the arm-side joint surface 4A. In this case, in the second step, a melted metal is hardly spread on the side surface 4B and formation or growth of a fillet in a vicinity of the side surface 4B of the arm 4 is easily suppressed. Note that in the first step, a rear surface of the arm-side joint surface 4A may be covered with an arm film or the rear surface of the arm-side joint surface 4A may not be covered with the arm film.

In the second step, the first overlapped region 4Aa of the arm-side joint surface 4A and the suspension-side joint surface 8A are overlapped with each other and heated. That is, the suspension-side joint surface 8A is made to come into contact with the first overlapped region 4Aa of the arm-side joint surface 4A and at least one of the arm film and the suspension film is heated and melted. As a result, the first joint part 12 is formed from at least one of the arm film and the suspension film. With the first joint part 12, the arm-side joint surface 4A and the suspension-side joint surface 8A are joined. The arm-side joint surface 4A may be also referred to as a joined surface on a side of the arm 4. The suspension-side joint surface 8A may be also referred to as a joined surface on a side of the suspension 8. In a case of performing the masking process before the first step, a process of removing a mask from the arm 4 or the suspension 8 may be performed after the second step.

In the second step, the arm film or the suspension film is melted and a melted metal is generated. The melted metal is spread to at least a part of the first non-overlapped region 4Ab. Specifically, the melted metal is easily spread to a part where the arm film or the suspension film is formed. By solidification of the spread melted metal, a part of the first joint part 12 (small fillet) is formed on the first non-overlapped region 4Ab. Since the first non-overlapped region 4Ab is located between the first overlapped region 4Aa and the side surface 4B of the arm, the melted metal hardly reaches the side surface 4B of the arm 4 from the first overlapped region 4Aa. Thus, the melted metal is hardly collected in the vicinity of the side surface 4B of the arm 4 and hardly flows off from the side surface 4B of the arm. Thus, formation or growth of a fillet on the side surface 4B of the arm is suppressed. Also, in the second step, the melted metal is spread not only to the first non-overlapped region 4Ab but also to a part of the side surface 8B of the suspension 8 which surface is substantially vertical to the first non-overlapped region 4Ab. Thus, formation or growth of a fillet in the vicinity of the side surface 4B of the arm is easily suppressed. In other words, the melted metal is easily collected along the groove between the arm-side joint surface 4A and the side surface 8B of the suspension 8, which surface is substantially vertical to the joint surface, and is hardly collected in the vicinity of the side surface 4B of the arm which surface is away from the side surface 8B of the suspension 8. As a result, formation or growth of a fillet in the vicinity of the side surface 4B of the arm is easily suppressed.

With the above principle, a HSA 2 in which formation or growth of a fillet in the vicinity of the side surface 4B of the arm is suppressed is obtained. That is, the HSA 2 with high accuracy of a size and a shape is obtained.

When there is not a first non-overlapped region 4Ab, a fillet is easily formed in the vicinity of the side surface 4B of the arm and accuracy of a size and a shape of the HSA 2 is easily impaired. The reason will be described with reference to FIGS. 16A and 16B.

Figure 16A:
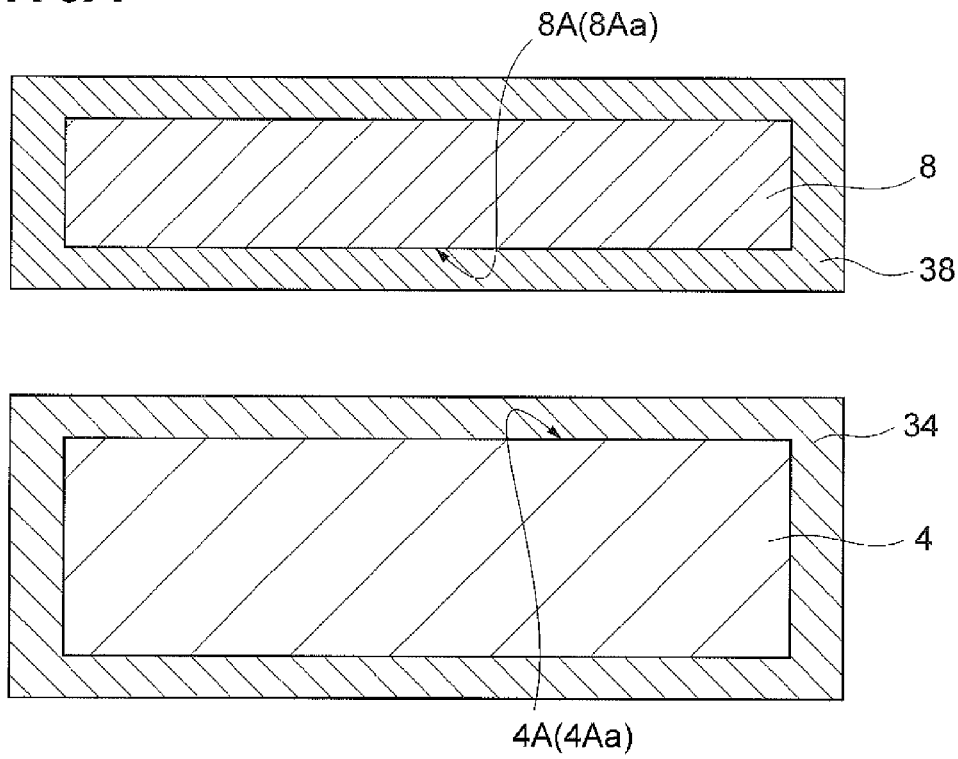
FIG. 16A is a schematic view illustrating a first step in a method of producing a magnetic head device according to a comparative example of the present invention.
Figure 16B:
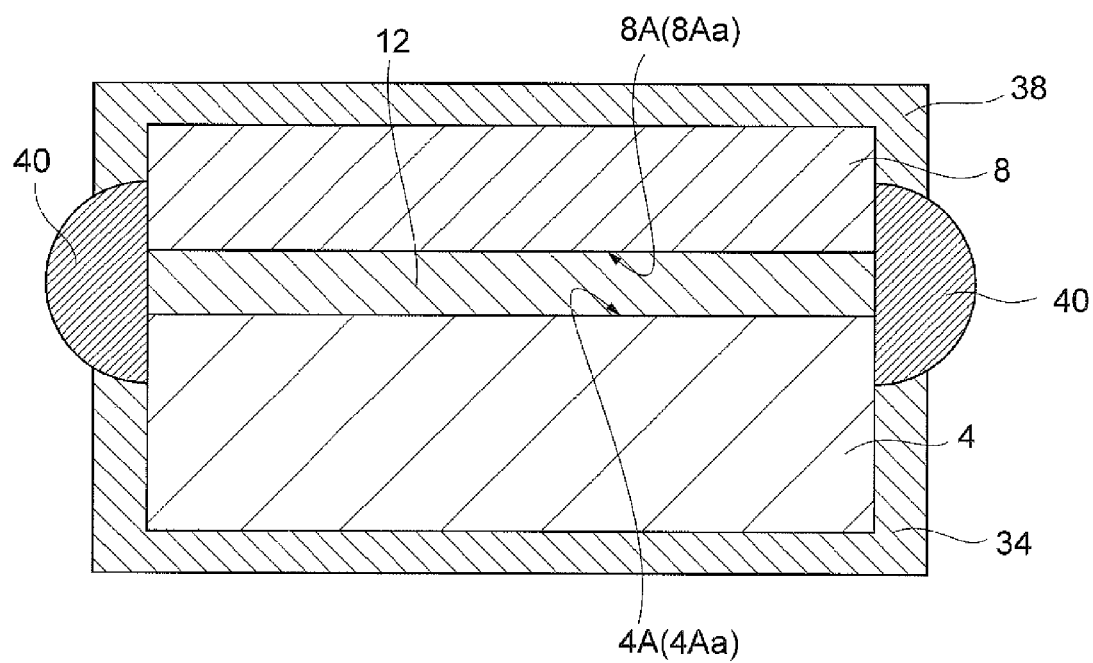
FIG. 16B is a schematic cross sectional view of an arm, a first joint part, and a suspension provided in the magnetic head device produced in the first step illustrated in FIG. 16A.

FIG. 16A is a view illustrating an arm 4 and a suspension 8 after a first step (before joining). FIG. 16B is a view illustrating a first joint part 12, a fillet 40, and the like formed in a second step using the arm 4 and the suspension 8 in FIG. 16A. A cross section of the arm 4 in each of FIGS. 16A and 16B is vertical in a longitudinal direction of the arm 4. A cross section of the suspension 8 in each of FIGS. 16A and 16B is vertical to a longitudinal direction of the suspension 8. As illustrated in FIG. 16A, in a transverse direction (short direction) of each of the arm 4 and the suspension 8, the arm-side joint surface 4A and the suspension-side joint surface 8A are completely overlapped with each other. That is, either of the arm-side joint surface 4A and the suspension-side joint surface 8A does not include a first non-overlapped region. In a second step, an arm film 34 or a suspension film 38 is heated and a melted metal is generated. When the arm 4 and the suspension 8 are made to come into contact with each other, there is not a first non-overlapped region. Thus, the melted metal flows from between the arm 4 and the suspension 8 to a side surface of each of the arm 4 and the suspension 8 and is solidified. As a result, a large fillet 40 protruded in a transverse direction (short direction) of each of the arm 4 and the suspension 8 is formed.

Similarly to a burr, the fillet 40 impairs accuracy of a size and a shape of a HSA 2 (magnetic head device). For example, in production of the HSA 2, a positioning hole may be formed in each of the arm 4 and the suspension 8 for alignment of positions of the arm 4 and the suspension 8. In a case where a fillet is formed in these positioning holes, accuracy of a size of the positioning holes is impaired and it becomes difficult to position the arm 4 and the suspension 8 accurately. Also, the fillet may fall out of the HSA 2 and may damage a surface of the magnetic disk 16.

On the other hand, according to the first embodiment, the first non-overlapped region 4Ab functions as a margin (blank space) where a melted metal is spread in the second step, as described above. Thus, the melted metal is hardly collected in the vicinity of the side surface 4B of the arm and formation or growth of a fillet in the vicinity of the side surface 4B of the arm is suppressed.

A heating method in the second step may be, for example, an atmosphere heating method such as reflow. In the second step, the arm-side joint surface 4A and the suspension-side joint surface 8A are heated, for example, at 150 to 450° C. By the heating in this temperature range, the first joint part 12 is formed easily and joint strength in the arm 4 and the suspension 8 is improved easily. The first joint part 12 may be formed by joining of the arm-side joint surface 4A and the suspension-side joint surface 8A by laser heating. However, it becomes more difficult to accurately irradiate each joint surface with a laser when an interval between suspensions 8 becomes smaller. On the other hand, when the atmosphere heating method is used, heat is easily transmitted to each joint surface in a uniform manner regardless of an interval between the suspensions 8. Thus, unevenness or a variation in joint strength between a plurality of the first joint parts 12 is easily suppressed.

A content of Sn in the first joint part 12 may be, for example, equal to or larger than 40 percent by mass and smaller than 100 percent by mass. In a case where the content of Sn is equal to or larger than 40 percent by mass, joint strength is easily improved. The content of Sn in the first joint part 12 is controlled freely, for example, by an adjustment of a content of Sn in the arm film or the suspension film formed in the first step.

A thickness of the first joint part 12 may be, for example, 2 to 50 μm or 5 to 30 μm. The thickness of the first joint part 12 may be also referred to as a space between the arm 4 and the suspension 8 joined via the first joint part 12. The thickness of the first joint part 12 is controlled freely, for example, by an adjustment of a thickness of the arm film or the suspension film formed in the first step. By control of making the first joint part 12 equal to or thicker than 2 μm, joint strength is improved easily. By control of making the first joint part 12 equal to or thinner than 50 μm, melting and flowing out (that is, bleeding) of a component composing the arm film or the suspension film and formation or growth of a fillet in the second step are easily controlled to a necessary and adequate degree.

A thickness of the suspension 8 may be, for example, 0.05 to 0.3 mm. A thickness of the arm 4 may be, for example, 0.3 to 1.0 mm.

A Sn-based alloy used in the first step is, for example, solder or a braze material. The Sn-based alloy may contain at least one kind selected from the group consisting of Ag, Cu, Bi, In, Ni, Zn, P, and Au in addition to Sn. By utilization of the Sn-based alloy containing these elements, the first joint part 12 is formed easily in the second step and joint strength is easily improved. Note that when one of the arm film and the suspension film includes Sn, it is not necessary for the other film to include Sn. For example, when one of the arm film and the suspension film includes Sn, the other film may be a film consisting of at least one kind selected from the group consisting of Ag, Cu, Bi, In, Ni, Zn, P, and Au. That is, the other film may be a film consisting of an element other than Sn. The arm film may be constituted by two overlapped films. One of the films includes Sn and the other does not necessarily include Sn. Similarly, the suspension film may be constituted by two overlapped films.

In the first step, one of the arm-side joint surface 4A and the suspension-side joint surface 8A may be covered with a Sn elementary substance or a Sn-based alloy and the other joint surface may be covered with a metal having a melting point higher than that of the Sn elementary substance or with a metal having a melting point higher than that of the Sn-based alloy. In a case where such a first step is performed, excessive melting and bleeding on each joint surface and formation or growth of a fillet in the second step are easily suppressed. As a result, the first joint part 12 easily becomes thick. The metal having a melting point higher than that of the Sn elementary substance or the Sn-based alloy is, for example, a Ni elementary substance or Ni including P. Thus, in the first step, one joint surface may be covered with a film consisting of the Sn elementary substance or the Sn-based alloy and the other joint surface may be covered with a film consisting of the Ni elementary substance or with a film consisting of Ni including P. The film consisting of Ni including P can be formed, for example, with an electroless nickel plating solution including a phosphorous compound. The phosphorous compound is, for example, hypophosphite such as sodium hypophosphite.

When the first joint part 12 includes a resin adhesive or when the first joint part 12 consists of a resin adhesive, a HSA 2 is produced, for example, by the following production method.

In a first step, at least one of the arm-side joint surface 4A and the suspension-side joint surface 8A is covered with an uncured resin adhesive. In other words, in the first step, a film including an uncured resin adhesive is formed at least on one of the arm-side joint surface 4A and the suspension-side joint surface 8A.

In a second step, the suspension-side joint surface 8A is made to come into contact with the first overlapped region 4Aa of the arm-side joint surface 4A and a resin adhesive between the arm 4 and the suspension 8 is cured. For example, when the resin adhesive is a thermosetting type, the first overlapped region 4Aa of the arm-side joint surface 4A and the suspension-side joint surface 8A are overlapped with each other and heated. As a result, the resin adhesive is cured and the first joint part 12 is formed.

Even in a case of forming the first joint part 12 with the resin adhesive, the uncured resin adhesive flows in the second step similarly to the melted metal. However, according to the first embodiment, the first non-overlapped region 4Ab functions as a margin (blank space) where the resin adhesive is spread in the second step. Thus, the resin adhesive is hardly collected in the vicinity of the side surface 4B of the arm and formation or growth of a fillet on the side surface 4B of the arm is suppressed. That is, in a case of forming the first joint part 12 with the resin adhesive, formation or growth of a fillet in the vicinity of the side surface 4B of the arm is suppressed according to a mechanism similar to a case of forming the first joint part 12 with a Sn elementary substance or a Sn-based alloy. In the first step, a basis material of the arm 4 may be exposed on a surface (side surface 4B) adjacent to the arm-side joint surface 4A. In this case, in a second step, an uncured resin adhesive is hardly spread on the side surface 4B and formation or growth of a fillet in the vicinity of the side surface 4B of the arm 4 is easily suppressed. Note that in the first step, the rear surface of the arm-side joint surface 4A may be covered with an uncured resin adhesive or the rear surface of the arm-side joint surface 4A may not be covered with an uncured resin adhesive.

As described above, in the first embodiment, the first joint part 12 chemically or physically joins the arm 4 and the suspension 8 regardless of whether the first joint part 12 includes Sn or a resin adhesive. Thus, according to the first embodiment, joint strength in the arm 4 and the suspension 8 is improved compared to a case where a mechanical joining method such as fitting and joining in a related art is used. Also, in the first embodiment, a part of the first joint part 12 protrudes from between the arm 4 and the suspension 8 and is in contact with the first non-overlapped region 4Ab of the arm 4 and the side surface 8B of the suspension 8. Thus, compared to a case where the first joint part 12 does not protrude from between the arm 4 and the suspension 8, an area of contact of the first joint part 12 with the arm 4 and the suspension 8 is large. Moreover, in the first embodiment, the first joint part 12 can be formed by surface contact. Thus, it is not necessary to make the arm 4 and the suspension 8 thick to form a fitting hole. That is, in the first embodiment, even when the arm 4 and the suspension 8 are too thin to perform fitting and joining, joint strength is hardly weakened. With these reasons, according to the HSA 2 of the first embodiment, it is possible to make the arm 4 and the suspension 8 thin and to increase the number of magnetic disks 16 while securing the joint strength. As a result, it is possible to realize a magnetic disk device 18 with high reliability and a large capacity compared to a related art.

In the above, the magnetic head device (HSA 2) according to the first embodiment of the present invention has been described. However, the present invention is not limited to the first embodiment. Even in other embodiments described in the following, a magnetic head device that has high joint strength in an arm and a suspension and high accuracy of a size and a shape is provided according to a mechanism similar to that of the first embodiment. In the following, only differences between the first embodiment and the other embodiments will be described and a description of a point common in the first embodiment and the other embodiments will be omitted.

(Second Embodiment)

Figure 6:
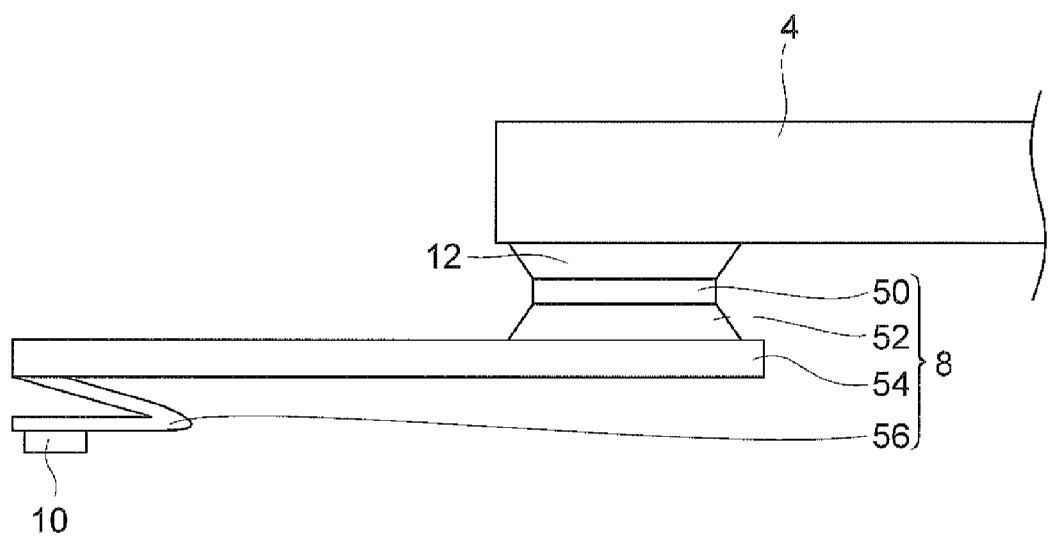
FIG. 6 is a schematic side view of an arm, a first joint part, a spacer, a second joint part, a load beam, a flexure, and a slider provided in a magnetic head device according to a second embodiment of the present invention.

As illustrated in FIG. 6, in a HSA according to the second embodiment, a suspension 8 includes a spacer 50, a load beam 54, and a flexure 56. That is, the suspension 8 is configured by the spacer 50, the load beam 54, and the flexure 56. The spacer 50 overlaps with a leading end part of an arm 4 and a first joint part 12 is located between the leading end part of the arm 4 and the spacer 50. That is, the first joint part 12 joins the arm 4 and the spacer 50. One leading end part of the load beam 54 overlaps with the spacer 50. A second joint part 52 is located between the spacer 50 and the load beam 54 and joins the spacer 50 and the load beam 54. The flexure 56 is provided to the other leading end part of the load beam 54 and a slider 10 is located on a surface of the flexure 56.

The spacer 50 in the second embodiment is a part of the suspension 8. That is, the spacer 50 corresponds to the suspension 8 in the first embodiment in a point that the spacer 50 is joined to the arm 4 by the first joint part 12. In the second embodiment, similarly to a case of the first embodiment, the first non-overlapped region 4Ab of the arm 4 functions as a margin (blank space) where a melted metal or a resin adhesive is spread in a second step. Thus, the melted metal or the resin adhesive is hardly collected in a vicinity of a side surface 4B of the arm and formation or growth of a fillet in the vicinity of the side surface 4B of the arm is suppressed.

Figure 7A:
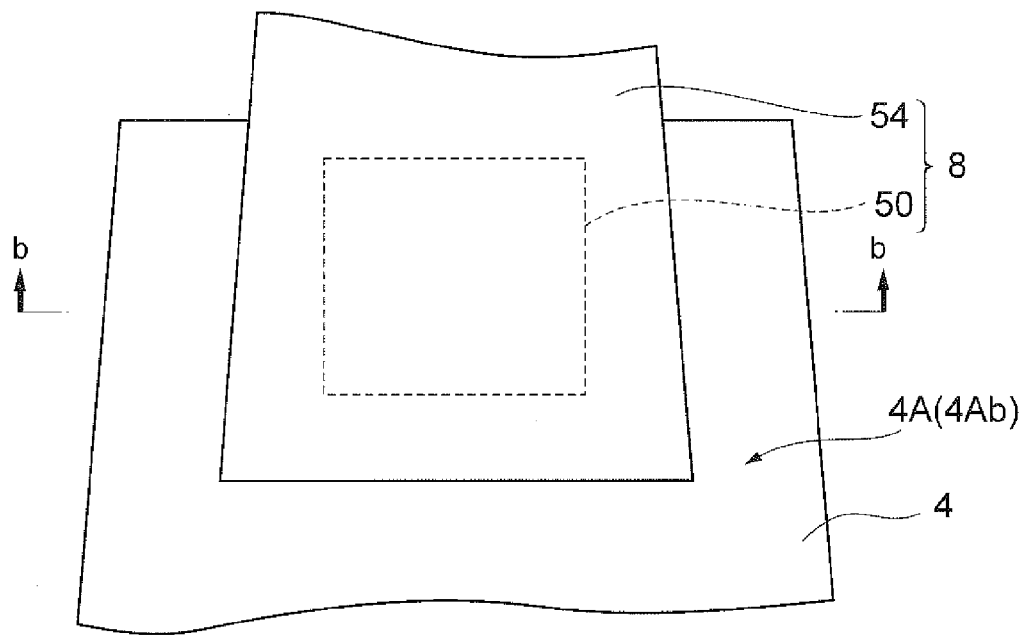
FIG. 7A is a schematic top view of a leading end of the arm and the load beam illustrated in FIG. 6.
Figure 7B:
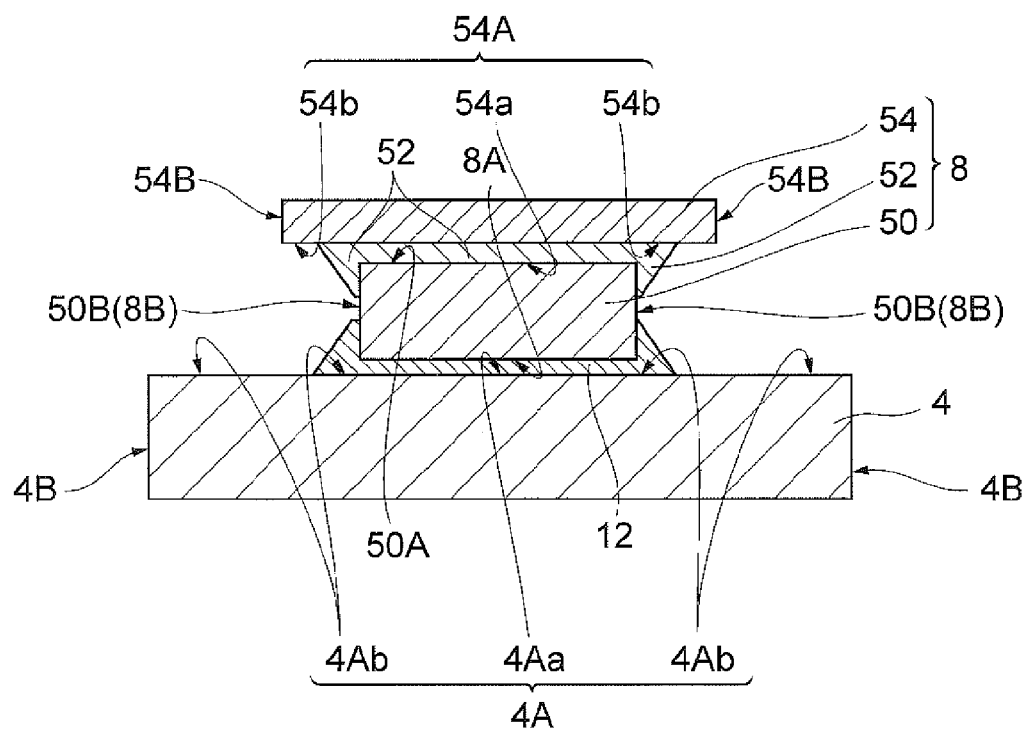
FIG. 7B is a schematic cross sectional view of the arm, the first joint part, the spacer, the second joint part, and the load beam in a b-b line in FIG. 7A.

The second joint part 52 includes Sn or a resin adhesive. Detailed composition of the second joint part 52 may be similar to that of the above-described first joint part 12. In the following, with reference to FIG. 7B, the second joint part 52 will be described in detail. FIG. 7B is a view illustrating a cross section, in a b-b line in FIG. 7A, of the arm 4, the first joint part 12, the spacer 50, the second joint part 52, and the load beam 54.

As illustrated in FIG. 7B, a spacer-side joint surface 50A is defined as a surface of the spacer 50 which surface faces the load beam 54. A load beam-side joint surface 54A is defined as a surface of the load beam 54 which surface faces the spacer 50. The load beam-side joint surface 54A between the spacer-side joint surface 50A and the load beam-side joint surface 54A includes a second overlapped region 54Aa that overlaps with the spacer-side joint surface 50A and a second non-overlapped region 54Ab that is not overlapped with the spacer-side joint surface 50A. In other words, a width in a transverse direction (short direction) of the load beam 54 is wider than that of the spacer 50. The second joint part 52 is in contact with both of the spacer 50 and the load beam 54 in the second overlapped region 54Aa of the load beam 54. A part of the second joint part 52 (small fillet) extends to at least a part of the second non-overlapped region 54Ab of the load beam 54. The part of the second joint part 52 also extends to a part of a side surface 50B of the spacer 50 which surface is adjacent to the spacer-side joint surface 50A. Since the spacer 50 is a part of the suspension 8, the side surface 50B of the spacer 50 can be also referred to as a side surface 8B of the suspension 8.

In a case where a second joint part 52 is an alloy including Sn, a HSA is produced by the following production method. First, similarly to the above first step, at least one of a spacer-side joint surface 50A and a load beam-side joint surface 54A is covered with a Sn elementary substance or a Sn-based alloy. Subsequently, similarly to the above second step, a second overlapped region 54Aa of the load beam-side joint surface 54A and the spacer-side joint surface 50A are overlapped with each other and heated, whereby the second joint part 52 is formed. In other words, a suspension 8 (load beam 54 to which spacer 50 is joined) is formed. Subsequently, by performance of the above first step and second step, a spacer 50 that is a part of the suspension 8 is joined to an arm 4 via a first joint part 12.

When the second joint part 52 includes a resin adhesive or when the second joint part 52 consists of a resin adhesive, a HSA is produced, for example, by the following production method. First, similarly to the above first step, at least one of the spacer-side joint surface 50A and the load beam-side joint surface 54A is covered with an uncured resin adhesive. Subsequently, similarly to the above second step, the spacer-side joint surface 50A is made to come into contact with the second overlapped region 54Aa of the load beam-side joint surface 54A and the resin adhesive between the spacer 50 and the load beam 54 is cured. For example, when the resin adhesive is a thermosetting type, the second overlapped region 54Aa of the load beam-side joint surface 54A and the spacer-side joint surface 50A are overlapped with each other and heated. As a result, the resin adhesive is cured and the second joint part 52 is formed.

In the second embodiment, during formation of the second joint part 52, the second non-overlapped region 54Ab of the load beam 54 functions as a margin (blank space) where a melted metal or an uncured resin adhesive is spread. As a result, the melted metal or the uncured resin adhesive is hardly collected in a vicinity of a side surface 54B of the load beam 54 and formation or growth of a fillet on the side surface 54B of the load beam 54 is suppressed.

In the second embodiment, the second joint part 52 chemically or physically joins the spacer 50 and the load beam 54. Thus, joint strength in the spacer 50 and the load beam 54 is improved compared to a case where a mechanical joining method such as fitting and joining in a related art is used. Also, in the second embodiment, a part of the second joint part 52 protrudes from between the spacer 50 and the load beam 54 and is in contact with the second non-overlapped region 54Ab of the load beam 54 and the side surface 50B of the spacer 50. Thus, an area of contact of the second joint part 52 with the spacer 50 and the load beam 54 is large compared to a case where the second joint part 52 does not protrude from between the spacer 50 and the load beam 54. Moreover, the second joint part 52 can be formed by surface contact. Thus, it is not necessary to make the spacer 50 and the load beam 54 thick to form a fitting hole. That is, even in a case where the spacer 50 and the load beam 54 are too thin and fitting and joining cannot be performed, joint strength in the spacer 50 and the load beam 54 is hardly weakened.

In another mode of the second embodiment, a spacer-side joint surface between the spacer-side joint surface and a load beam-side joint surface may include a second overlapped region that overlaps with the load beam-side joint surface and a second non-overlapped region that is not overlapped with the load beam-side joint surface. That is, a width of the spacer may be wider than a width in a transverse direction (short direction) of the load beam. In this case, a part of the second joint part 52 protruding from between the spacer and the load beam (small fillet) may extend to at least a part of the second non-overlapped region of the spacer. Also, the part of the second joint part may extend to a part of a side surface of the load beam which surface is adjacent to the load beam-side joint surface.

(Third Embodiment)

Figure 8:
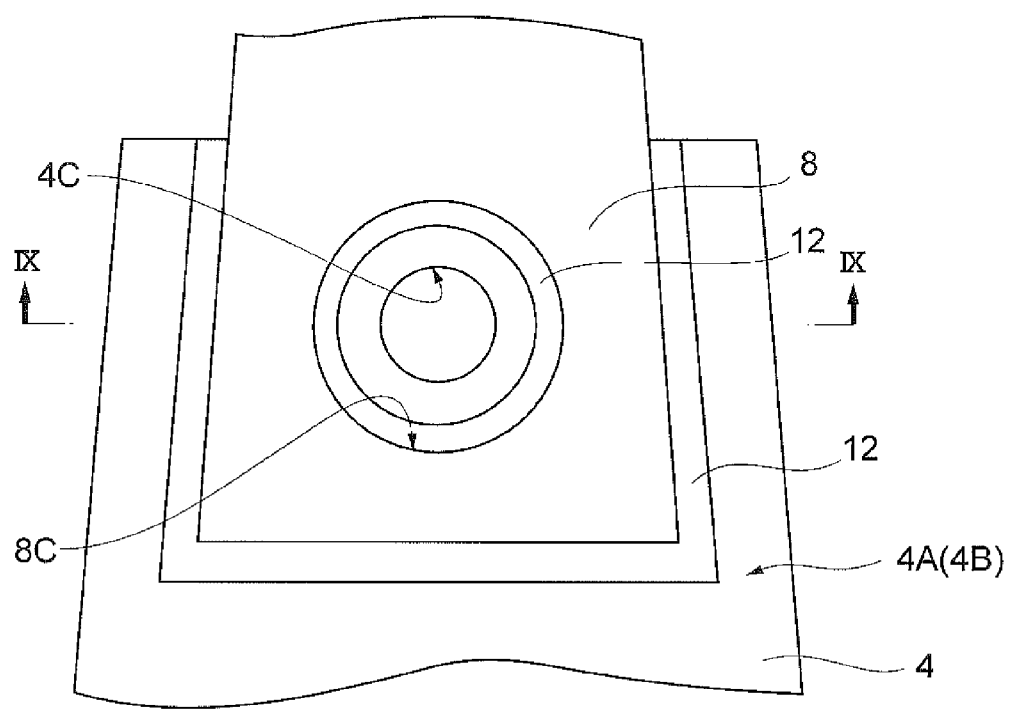
FIG. 8 is a schematic top view of a leading end of an arm and a suspension provided in a magnetic head device according to a third embodiment of the present invention.
Figure 9:
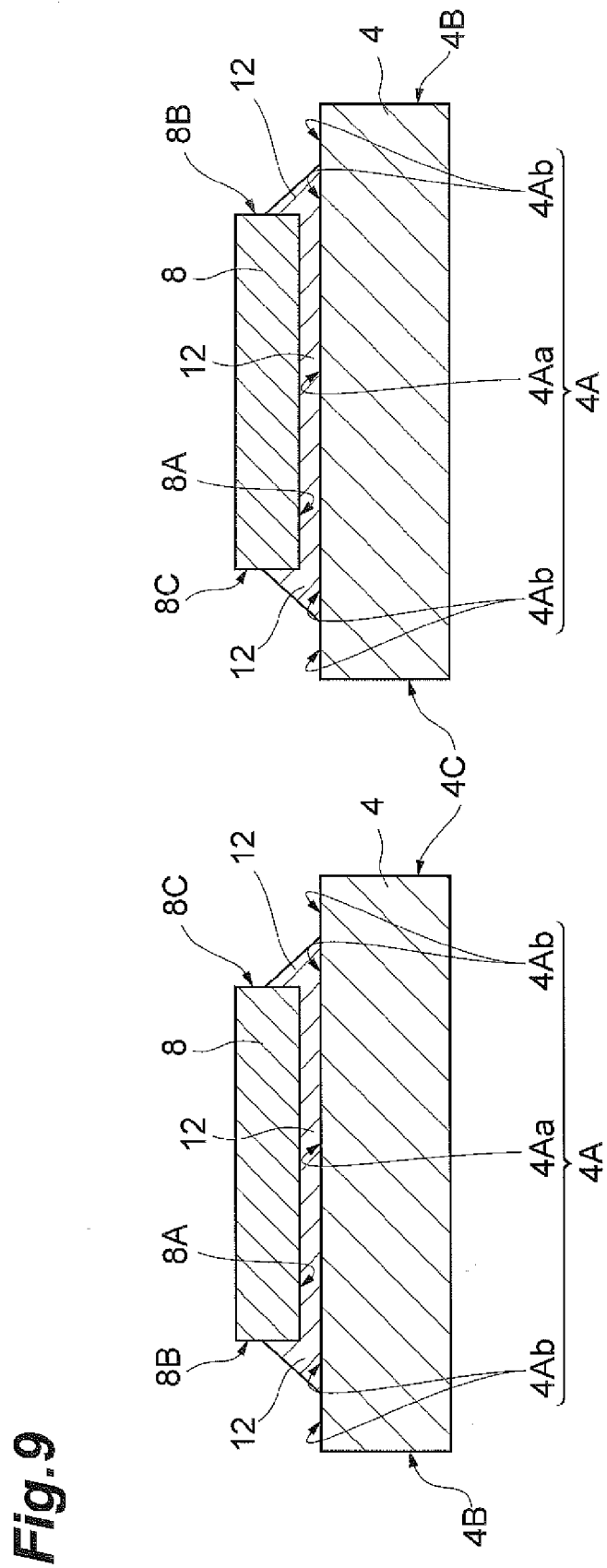
FIG. 9 is a schematic cross sectional view of the arm, a first joint part, and a spacer in a IX-IX line in FIG. 8.

As illustrated in each of FIG. 8 and FIG. 9, in a HSA according to the third embodiment, a circular hole penetrates a suspension 8 in a direction in which an arm 4 and the suspension 8 are overlapped with each other. The hole is referred to as a suspension through-hole 8C. Also, in the same direction, a circular hole penetrates the arm 4. This hole is referred to as an arm through-hole 4C. A central axis of the suspension through-hole 8C is identical to a central axis of the arm through-hole 4C. An inner diameter of the suspension through-hole 8C is larger than an inner diameter of the arm through-hole 4C. As illustrated in FIG. 8, the arm through-hole 4C and a surface of the arm 4 which surface surrounds the arm through-hole 4C (first non-overlapped region) are exposed on an inner side of the suspension through-hole 8C. A part of the first joint part 12 is formed along an inner periphery of the suspension through-hole 8C and an outer periphery of the suspension 8.

FIG. 9 is a view illustrating a pair of cross sections, in a IX-IX line in FIG. 8, of the arm 4, the suspension 8, and the first joint part 12 according to the third embodiment. In the pair of cross sections illustrated in FIG. 9, a pair of inner walls of the arm through-hole 4C is located on an inner side of a pair of side surfaces 4B of the arm 4. Also, on an inner side of a pair of side surfaces 8B of the suspension 8, a pair of inner walls of the suspension through-hole 8C is located. Except for these points, each of the pair of cross sections illustrated in FIG. 9 is substantially similar to the cross section in FIG. 5B. That is, each of the pair of cross sections illustrated in FIG. 9 is substantially similar to the cross section of the arm 4, the suspension 8, and the first joint part 12 in the first embodiment. Thus, in the third embodiment, similarly to a case of the first embodiment, a first non-overlapped region 4Ab of the arm 4 functions as a margin (blank space) where a melted metal or a resin adhesive is spread in a second step. Thus, the melted metal or the resin adhesive is hardly collected in a vicinity of the side surface 4B of the arm and formation or growth of a fillet in the vicinity of the side surface 4B of the arm is suppressed.

In the third embodiment, in the second step, an arm-side joint surface 4A and a suspension-side joint surface 8A are overlapped with each other in such a manner that a central axis of the suspension through-hole 8C and a central axis of the arm through-hole 4C become identical to each other. That is, by alignment of positioning holes, the arm 4 and the suspension 8 are positioned accurately. When a fillet is formed in these through-holes, accuracy of a size of the through-holes is impaired and it becomes difficult to position the arm 4 and the suspension 8 accurately. However, in the third embodiment, similarly to a case of the first embodiment, the first non-overlapped region 4Ab of the arm 4 functions as a margin (blank space) where a melted metal or a resin adhesive is spread in the second step. Thus, the melted metal or the resin adhesive is hardly collected in a vicinity of the inner wall of the arm through-hole 4C and formation or growth of a fillet in the inner wall of the arm through-hole 4C is suppressed. Thus, by alignment of a position of the arm through-hole 4C, it is possible to place the arm 4 accurately.

(Fourth Embodiment)

Figure 10:
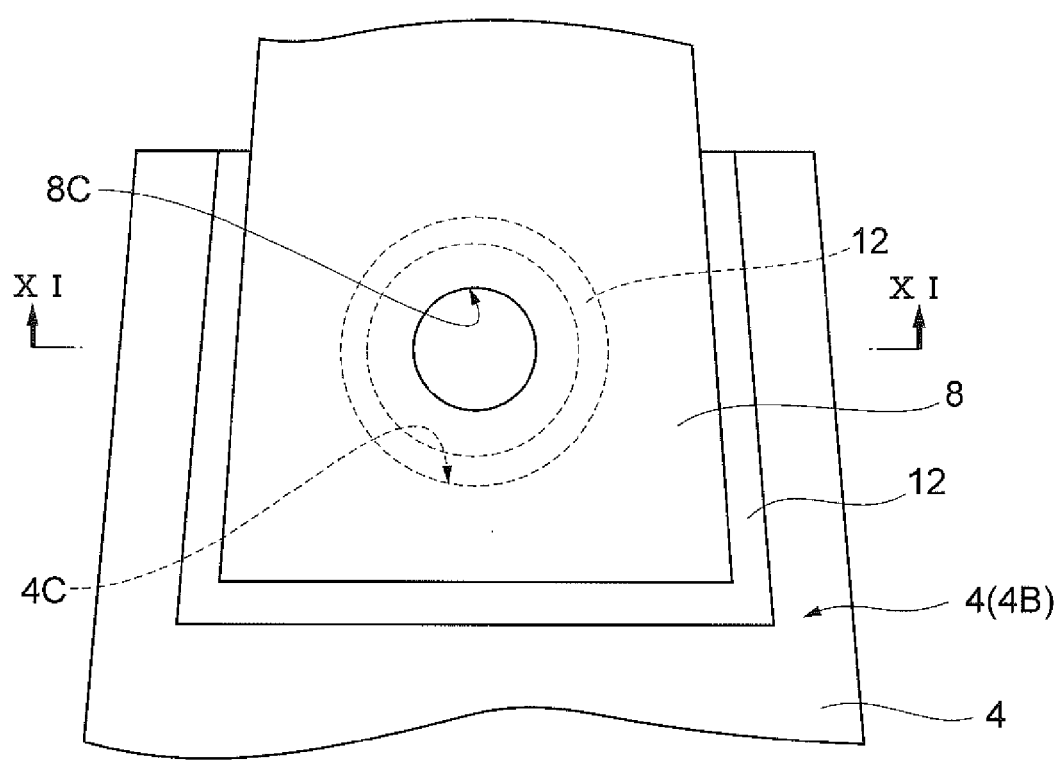
FIG. 10 is a schematic top view of a leading end of an arm and a suspension provided in a magnetic head device according to a fourth embodiment of the present invention.

As illustrated in FIG. 10, in a HSA according to the fourth embodiment, an inner diameter of a suspension through-hole 8C is smaller than an inner diameter of an arm through-hole 4C. Then, in the fourth embodiment, a part of a first joint part 12 is formed along an inner periphery of the arm through-hole 4C and an outer periphery of the suspension 8.

Figure 11:
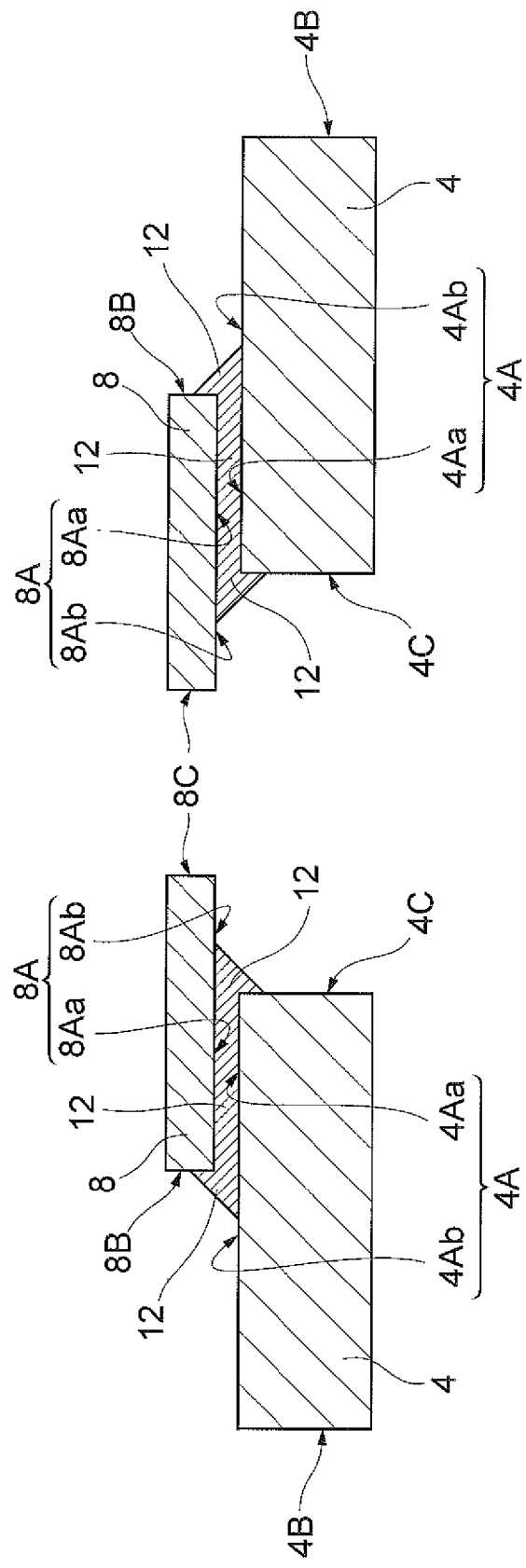
FIG. 11 is a schematic cross sectional view of the arm, a first joint part, and a spacer in a XI-XI line in FIG. 10.

FIG. 11 is a view illustrating a cross section, in a XI-XI line in FIG. 10, of an arm 4, a suspension 8, and a first joint part 12 according to the fourth embodiment. As illustrated in FIG. 11, in the fourth embodiment, each of an arm-side joint surface 4A and a suspension-side joint surface 8A includes a first overlapped region and a first non-overlapped region.

That is, the arm-side joint surface 4A includes a first overlapped region 4Aa that overlaps with the suspension-side joint surface 8A and a first non-overlapped region 4Ab that is not overlapped with the suspension-side joint surface 8A. The suspension-side joint surface 8A includes a first overlapped region 8Aa that overlaps with the arm-side joint surface 4A and a first non-overlapped region 8Ab that is not overlapped with the arm-side joint surface 4A. The first joint part 12 is in contact with both of the arm 4 and the suspension 8 in the first overlapped region 4Aa of the arm 4. In other words, the first joint part 12 is in contact with both of the arm 4 and the suspension 8 in the first overlapped region 8Aa of the suspension 8.

One end of the first joint part 12 extends to at least a part of the first non-overlapped region 4Ab of the arm 4. Also, the one end of the first joint part 12 extends to a part of a side surface 8B of the suspension 8 which surface is adjacent to the suspension-side joint surface 8A. In the fourth embodiment, the first non-overlapped region 4Ab of the arm 4 functions as a margin (blank space) where a melted metal or a resin adhesive is spread in a second step. Thus, the melted metal or the resin adhesive is hardly collected in a vicinity of a side surface 4B of the arm 4 and formation or growth of a fillet in the vicinity of the side surface 4B of the arm 4 is suppressed.

The other end of the first joint part 12 extends to at least a part of the first non-overlapped region 8Ab of the suspension 8. Also, the other end of the first joint part 12 extends to a part of an inner wall of the arm through-hole 4C which wall is adjacent to the arm-side joint surface 4A. In the fourth embodiment, the first non-overlapped region 8Ab of the suspension 8 functions as a margin (blank space) where a melted metal or a resin adhesive is spread in a second step. Thus, the melted metal or the resin adhesive is hardly collected in a vicinity of an inner wall of the suspension through-hole 8C and formation or growth of a fillet in the inner wall of the suspension through-hole 8C is suppressed. Thus, by alignment of a position of the suspension through-hole 8C, it is possible to place the suspension 8 accurately.

(Fifth Embodiment)

Figure 12:
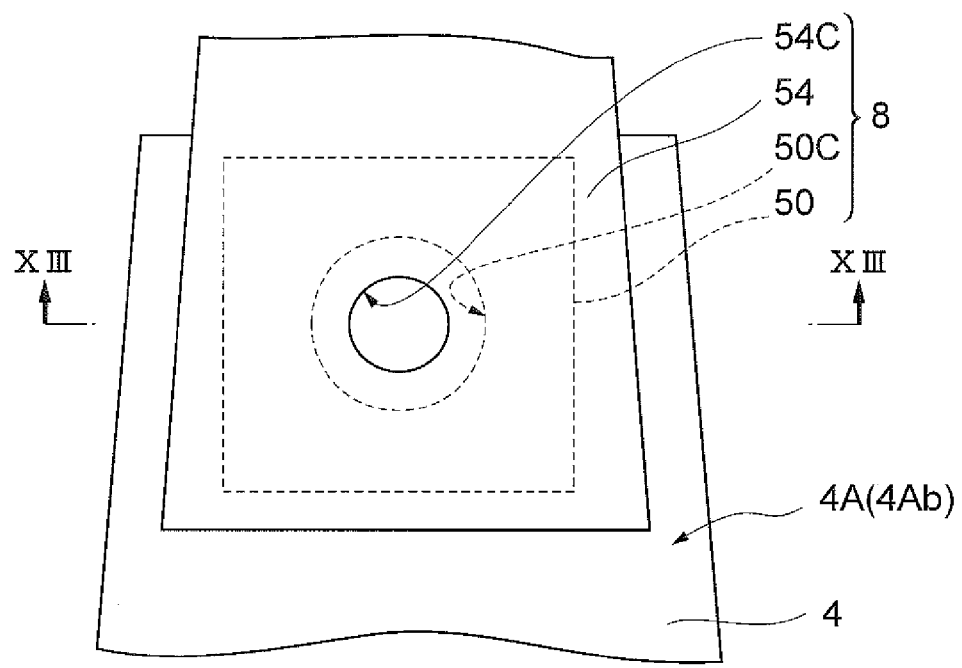
FIG. 12 is a schematic top view of a leading end of an arm and a load beam provided in a magnetic head device according to a fifth embodiment of the present invention.
Figure 13:
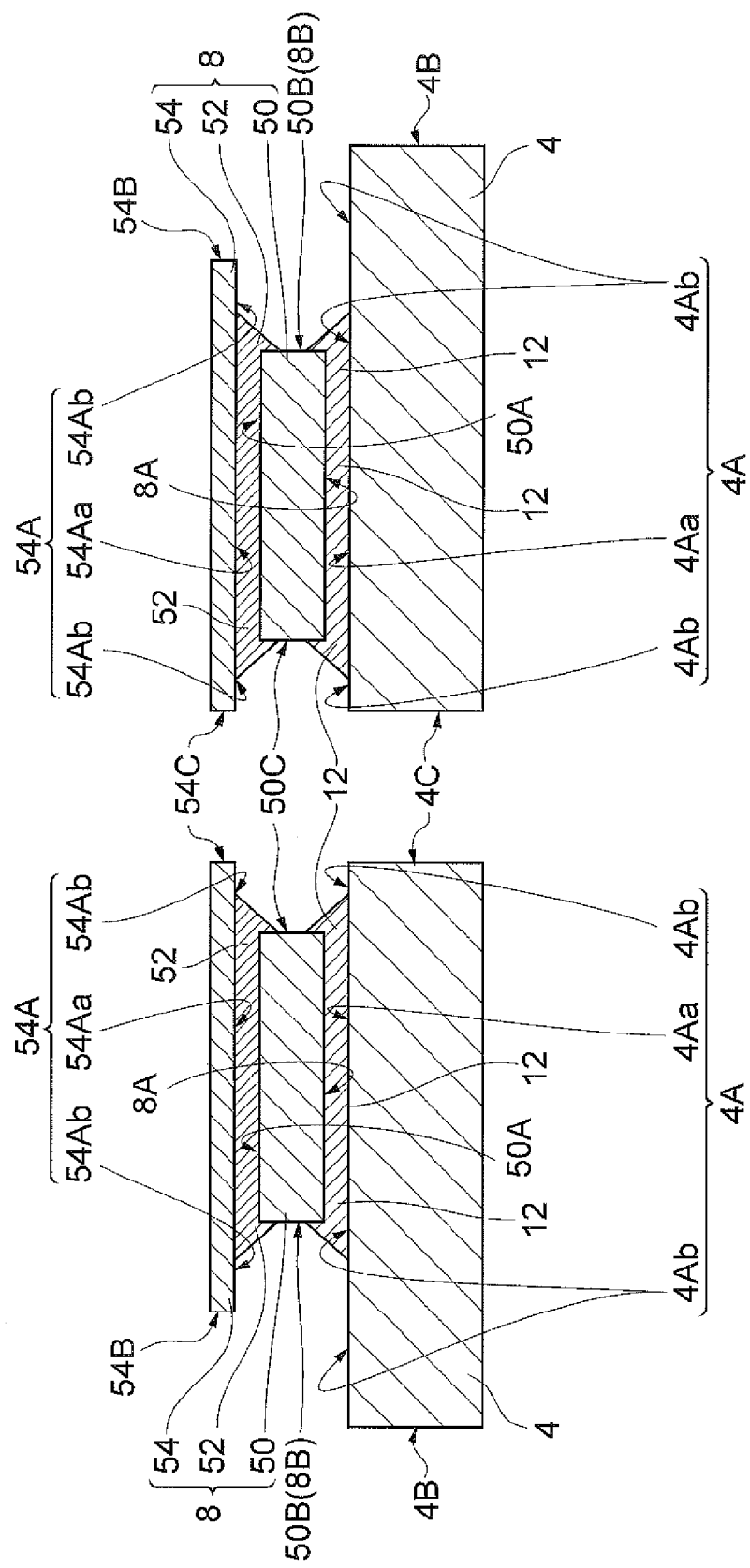
FIG. 13 is a schematic cross sectional view of the arm, a first joint part, a spacer, a second joint part, and the load beam in a XIII-XIII line in FIG. 12.

As illustrated in each of FIG. 12 and FIG. 13, similarly to the second embodiment, in a HSA according to the fifth embodiment, a spacer 50 overlaps with a leading end part of an arm 4 and a first joint part 12 joins the arm 4 and the spacer 50 (part of suspension 8). One leading end part of a load beam 54 overlaps with the spacer 50 and a second joint part 52 joins the spacer 50 and the load beam 54.

In the fifth embodiment, in a direction in which the arm 4, the spacer 50, and the load beam 54 are overlapped with each other, a circular through-hole is formed in each of the arm 4, the spacer 50, and the load beam 54. The through-hole formed in the spacer 50 will be referred to as a spacer through-hole 50C. The through-hole formed in the load beam 54 will be referred to as a load beam through-hole 54C. Central axes of the arm through-hole 4C, the spacer through-hole 50C, and the load beam through-hole 54C are identical to each other. An inner diameter of the load beam through-hole 54C is substantially identical to an inner diameter of the arm through-hole 4C. An inner diameter of the spacer through-hole 50C is larger than the inner diameter of the arm through-hole 4C. A part of the first joint part 12 protrudes from between the arm 4 and the spacer 50 and is formed along an inner periphery of the spacer through-hole 50C and an outer periphery of the spacer 50. A part of the second joint part 52 protrudes from between the spacer 50 and the load beam 54 and is formed along the inner periphery of the spacer through-hole 50C and the outer periphery of the spacer 50.

FIG. 13 is a view illustrating a pair of cross sections, in a XIII-XIII line in FIG. 12, of the arm 4, the first joint part 12, the spacer 50, the second joint part 52, and the load beam 54 according to the fifth embodiment. In the pair of cross sections illustrated in FIG. 13, a pair of inner walls of the arm through-hole 4C is located on an inner side of a pair of side surfaces 4B of the arm 4. A pair of inner walls of the spacer through-hole 50C is located on an inner side of a pair of side surfaces 8B of the spacer 50. A pair of inner walls of the load beam through-hole 54C is located on an inner side of a pair of side surfaces 54B of the load beam 54. Except for these points, each of the pair of cross sections illustrated in FIG. 13 is substantially similar to the cross section in FIG. 7B. That is, each of the pair of cross sections illustrated in FIG. 13 is substantially similar to the cross section of the arm 4, the first joint part 12, the spacer 50, the second joint part 52, and the load beam 54 in the second embodiment.

Similarly to the second embodiment, in the fifth embodiment, during formation of the second joint part 52, a second non-overlapped region 54Ab of the load beam 54 functions as a margin (blank space) where a melted metal or an uncured resin adhesive is spread. As a result, the melted metal or the uncured resin adhesive is hardly collected in a vicinity of the side surface 54B of the load beam 54 and the load beam through-hole 54C. Thus, formation or growth of a fillet on the side surface 54B of the load beam 54 and in the load beam through-hole 54C is suppressed. Thus, in the fifth embodiment, it is possible to position the load beam 54 accurately by alignment of the load beam through-hole 54C.

Sixth Embodiment

Figure 14A:
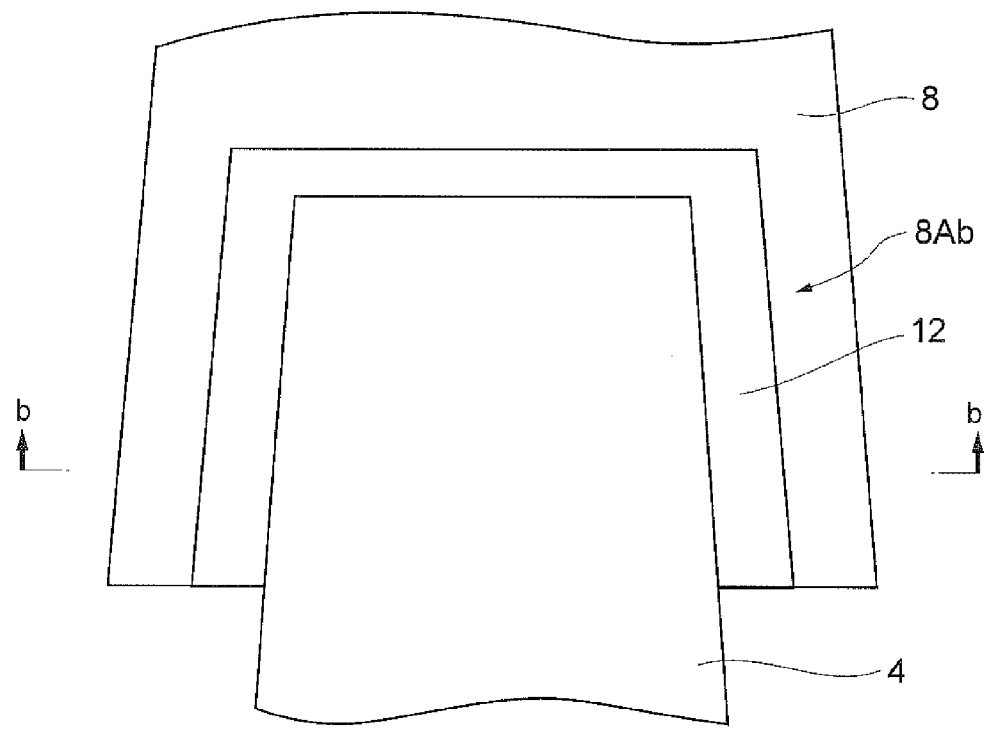
FIG. 14A is a schematic top view of a leading end of an arm and a suspension provided in a magnetic head device according to a sixth embodiment of the present invention.
Figure 14B:
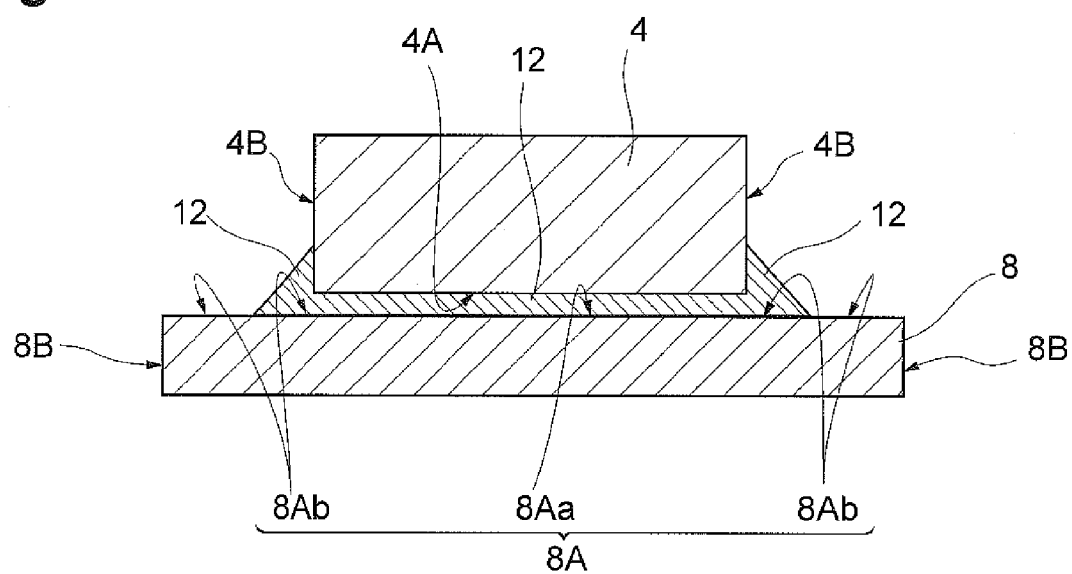
FIG. 14B is a schematic cross sectional view of the arm, a first joint part, and the suspension in a b-b line in FIG. 14A.

As illustrated in each of FIG. 14A and FIG. 14B, in the sixth embodiment, a width in a transverse direction (short direction) of a suspension 8 is wider than a width in the transverse direction (short direction) of an arm 4. In the sixth embodiment, a suspension-side joint surface 8A between an arm-side joint surface 4A and a suspension-side joint surface 8A includes a first overlapped region 8Aa that overlaps with the arm-side joint surface 4A and a first non-overlapped region 8Ab that is not overlapped with the arm-side joint surface 4A. In the first overlapped region 8Aa, a first joint part 12 is in contact with both of the arm 4 and the suspension 8. A part of the first joint part 12 extends at least to a part of the first non-overlapped region 8Ab of the suspension 8. The part of the first joint part 12 also extends to a part of a side surface 4B of the arm 4 which surface is adjacent to the arm-side joint surface 4A.

In the sixth embodiment, during formation of the second joint part 52, the second non-overlapped region 8Ab of the suspension 8 functions as a margin (blank space) where a melted metal or an uncured resin adhesive is spread. Also, the melted metal or the uncured resin adhesive is spread not only to the first non-overlapped region 8Ab of the suspension 8 but also to the part of the side surface 4B of the arm 4 which surface is adjacent to the arm-side joint surface 4A. With these reasons, the melted metal or the uncured resin adhesive is hardly collected in a vicinity of the side surface 8B of the suspension 8 and formation or growth of a fillet on the side surface 8B of the suspension 8 is suppressed. In a first step of the sixth embodiment, a basis material of the suspension 8 may be exposed on a surface (side surface 8B) adjacent to the suspension-side joint surface 8A. The basis material of the suspension 8 with low wettability with respect to a melted metal or an uncured resin adhesive is exposed on the side surface 8B, whereby the melted metal or the uncured resin adhesive is hardly spread on the side surface 8B in a second step and formation or growth of a fillet in a vicinity of the side surface 8B of the suspension 8 is easily suppressed. Note that in the first step of the sixth embodiment, a rear surface of the suspension-side joint surface 8A may be covered with a suspension film or an uncured resin adhesive. The rear surface of the suspension-side joint surface 8A may not be covered with the suspension film or uncured resin adhesive.

(Seventh Embodiment)

Figure 15:
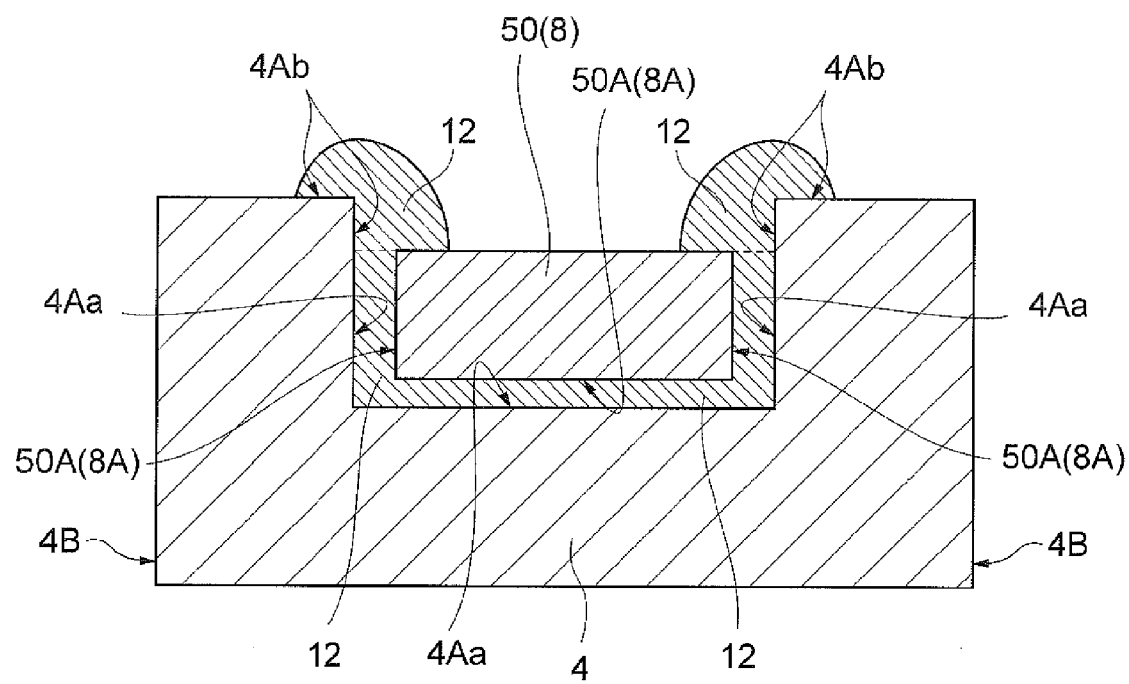
FIG. 15 is a schematic cross sectional view of an arm, a first joint part, and a spacer (part of suspension) provided in a magnetic head device according to a seventh embodiment of the present invention.

FIG. 15 is a cross sectional view in a vicinity of a leading end part of an arm 4 in a direction vertical to a longitudinal direction of the arm 4. As illustrated in FIG. 15, in the seventh embodiment, a part of an arm-side joint surface forms a concave portion. A whole spacer 50 (or suspension 8) is positioned on an inner side of the concave portion. A bottom of the concave portion and a part of an inner wall on the arm-side joint surface is a first overlapped region 4Aa. A part of a surface of the spacer 50 (or suspension 8) which part faces the bottom of the concave portion and the part of the inner wall is all a spacer-side joint surface 50A (or suspension-side joint surface 8A). The remaining part of the inner wall of the concave portion and an arm-side joint surface 4A surrounding the concave portion are a first non-overlapped region 4Ab. A first joint part 12 fills a space between the bottom of the concave portion, the part of the inner wall, and the spacer 50 (or suspension 8). A part of the first joint part 12 extends to the first non-overlapped region 4Ab of the arm 4. Also, the part of the first joint part 12 extends to a part of a top surface of the spacer 50 (or suspension 8) which surface faces an opposite side of the bottom of the concave portion.

In the seventh embodiment, during formation of the second joint part 52, the second non-overlapped region 4Ab of the arm 4 functions as a margin (blank space) where a melted metal or an uncured resin adhesive is spread. Also, the melted metal or the uncured resin adhesive is spread not only to the second non-overlapped region 4Ab of the arm 4 but also to a part of the top surface of the spacer 50 (or suspension 8). With these reasons, the melted metal or the uncured resin adhesive is hardly collected in a vicinity of a side surface 4B of the arm 4 and formation or growth of a fillet on the side surface 4B of the arm 4 is suppressed.

(Modification Example of First to Seventh Embodiments)

A magnetic head device may be a head arm assembly (HAA) comprising an arm 4, a suspension 8 overlapping with a leading end part of the arm 4, a slider 10 located at a leading end part of the suspension 8, and a first joint part 12 that is located between the leading end part of the arm 4 and the suspension 8 and that joins the arm 4 and the suspension 8, the first joint part 12 including Sn.

A spacer 50 and a load beam 54 may be welded directly, for example, by spot welding. In this case, a second joint part 52 is not necessarily formed between the spacer 50 and the load beam 54.

(Reference Signs List in FIGS. 1 to 16B)

2 . . . HSA (magnetic head device), 4 . . . arm, 4A . . . arm-side joint surface, 4Aa . . . first overlapped region of arm, 4Ab . . . first non-overlapped region of arm, 6 . . . carriage, 8 . . . suspension, 8A . . . suspension-side joint surface, 8Aa . . . first overlapped region of suspension, 8Ab . . . first non-overlapped region of suspension, 10 . . . slider, 11 . . . HGA, 12 . . . first joint part, 14 . . . coil part, 16 . . . magnetic disk, 18 . . . magnetic disk device, 20 . . . spindle motor, 22 . . . permanent magnet, 34 . . . arm film, 38 . . . suspension film, 40 . . . fillet, 50 . . . spacer, 50A . . . spacer-side joint surface, 52 . . . second joint part, 54 . . . load beam, 54A . . . load beam-side joint surface, 54Aa . . . second overlapped region of load beam, 54Ab . . . second non-overlapped region of load beam, 56 . . . flexure

[Second Aspect of the Present Invention]

Figure 2:
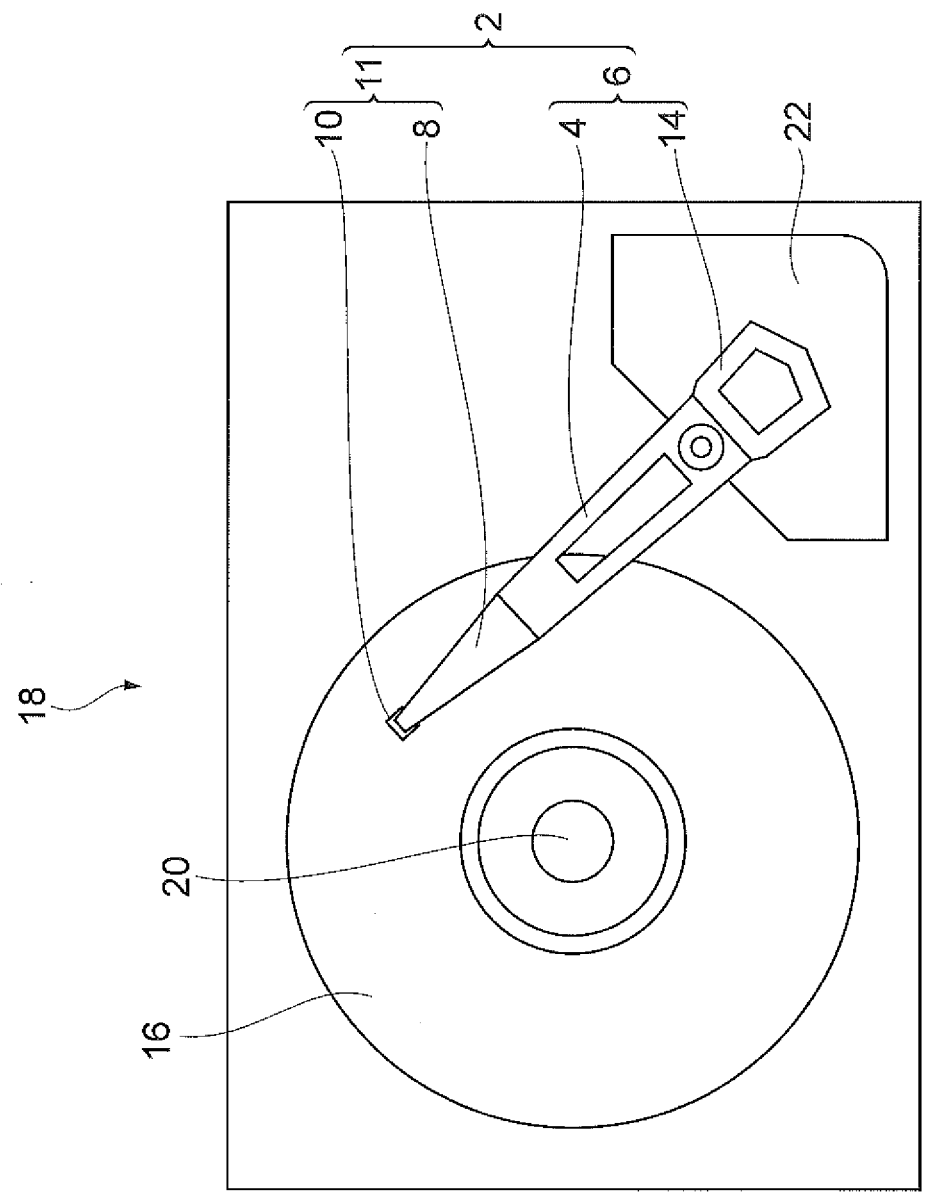
FIG. 2 is a schematic top view of a magnetic disk device comprising the magnetic head device according to the first or eighth embodiment of the present invention.
Figure 3:
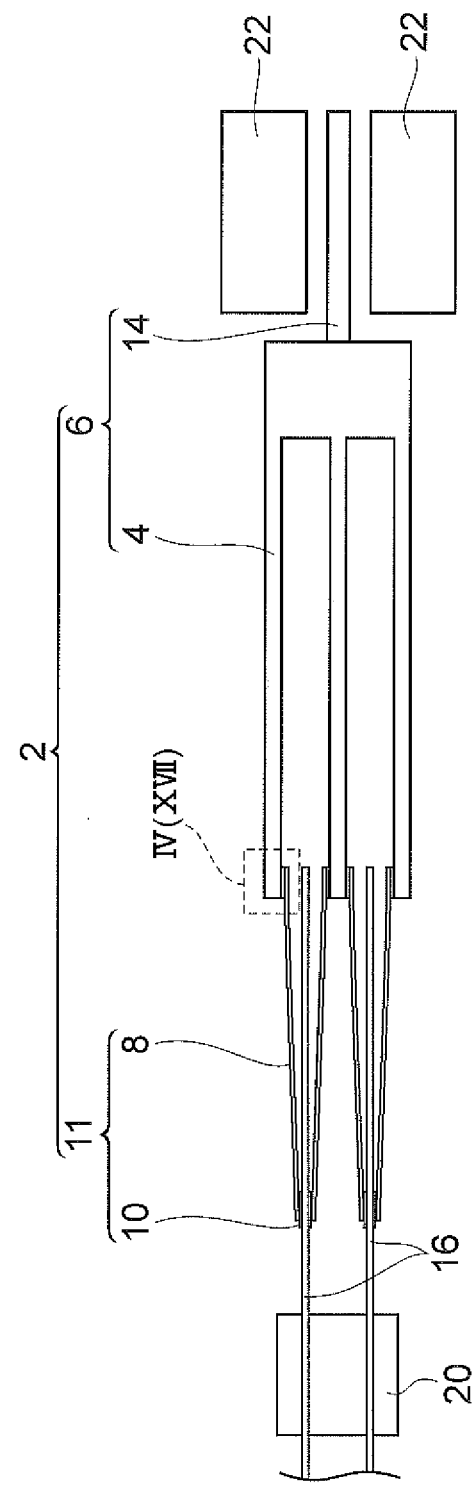
FIG. 3 is a schematic side view of the magnetic disk device illustrated in FIG. 2.
Figure 4:
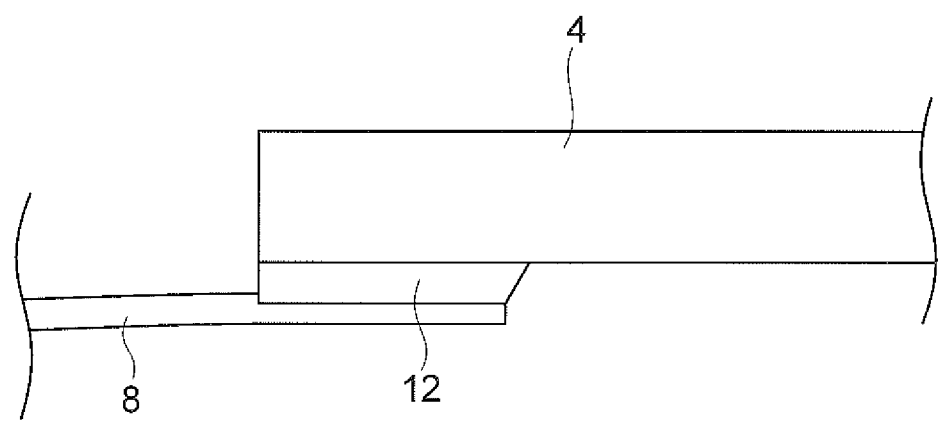
FIG. 4 is a schematic enlarged view that is related to a first aspect of the present invention and that illustrates an arm, a first joint part, and a suspension provided in the magnetic head device illustrated in FIG. 3.

In the following, each embodiment of a second aspect of the present invention will be described with reference to FIGS. 1 to 3 and FIGS. 17A to 23. The following eighth to thirteenth embodiments are detailed examples of the second aspect of the present invention. FIGS. 1 to 3 are common in the first aspect and the second aspect of the present invention. Each reference sign in FIGS. 17A to 23 according to the second aspect of the present invention is not necessarily common to each reference sign in FIGS. 4 to 16B according to the first aspect of the present invention. In FIGS. 1 to 3 and FIGS. 17A to 23, the same reference sign is assigned to the same or similar configurations. The second aspect of present invention is not limited to the following embodiment.

(Eighth Embodiment)

A magnetic head device according to the eighth embodiment is a head stack assembly (HSA). As illustrated in FIG. 1, FIG. 2, FIG. 3, and FIG. 17A and FIG. 17B, a HSA 2 comprises a carriage 6 having a plurality of arms 4, suspensions 8 respectively overlapping with leading end parts of the arms 4, sliders 10 respectively located at the leading end parts of the suspensions 8, a first joint part 12 that is located between the leading end part of each arm 4 and each suspension 8 and that joins the arm 4 and the suspension 8. In other words, the HSA 2 comprises the carriage 6 having the plurality of arms 4, head gimbal assemblies (HGA 11) respectively joined to the leading end parts of the arms 4, and the first joint part 12 joining each arm 4 and each HGA 11. Each of the arms 4 and suspensions 8 may be flat or plate-shaped. Each of the arms 4 and suspensions 8 may be extended in a predetermined direction. That is, each of the arms 4 and suspensions 8 may be elongated. Each of the suspensions 8 may overlap only with one surface of a leading end part of one arm 4. One suspension 8 may overlap with a surface of a leading end part of one arm 4 and another suspension 8 may overlap with a rear surface of the leading end part of the arm 4. That is, a leading end part of one arm 4 may be sandwiched by a pair of suspensions 8. A magnetic head (such as thin-film magnetic head) is embedded in each slider 10. The plurality of arms 4 and HGAs 11 are overlapped with each other in the same direction with predetermined intervals. For convenience of description, three arms 4 are illustrated. However, the number of arms 4 is not limited. For convenience of description, four suspensions 8 and four sliders 10 are illustrated. However, the number of suspensions 8 and that of sliders 10 are not limited.

The HSA 2 is mounted in a magnetic disk device 18 (HDD) comprising a plurality of magnetic disks 16. The plurality of magnetic disks 16 are attached to a spindle motor 20 and overlapped with each other with predetermined intervals. Each of the magnetic disks 16 may be arranged between a pair of HGAs 11. Each slider 10 located at a leading end part of each HGA 11 faces the magnetic disk 16. A part of the carriage 6 which part is located on an opposite side of each arm 4 is a coil part 14. The coil part 14 and a pair of permanent magnets 22 which sandwich and face the coil part 14 constitute a voice coil motor (VCM). For convenience of description, two magnetic disks 16 are illustrated. However, the number of magnetic disks 16 is not limited.

A first joint part 12 includes Sn or a resin adhesive. The first joint part 12 includes one of Sn or a resin adhesive. The first joint part 12 may include a Sn elementary substance. The first joint part 12 may consist only of a Sn elementary substance. The first joint part 12 may include an alloy containing Sn. The first joint part 12 may consist only of an alloy containing Sn. The alloy containing Sn may contain at least one kind selected from the group consisting of Ag, Cu, Bi, In, Ni, Zn, P, and Au. In the following, the alloy containing Sn may be referred to as an "Sn-based alloy." A resin adhesive included in the first joint part 12 means an already-cured resin adhesive. The first joint part 12 may consist only of a cured resin adhesive. The resin adhesive may be, for example, a thermosetting resin. The thermosetting resin may be, for example, an epoxy resin or a phenolic resin.

A substance composing an arm 4 (basis material of arm 4) is not specifically limited but may be, for example, aluminum (Al). A part or a whole of a surface of the arm 4 may be a protective layer consisting of Ni—P (Ni including phosphorus). That is, the arm 4 may have a substrate (basis material) consisting of Al or the like and a protective layer covering a part or a whole of a surface of the substrate. The first joint part 12 may be located on the protective layer constituting the surface of the arm 4. A substance composing a whole carriage 6 (except for coil part 14) may be the same with the substance composing the arm 4. A part or a whole of the surface of the carriage 6 (except for coil part 14) may be the protective layer. A substance composing a suspension 8 (basis material of suspension 8) is not specifically limited but may be, for example, stainless steel (SUS).

Figure 17A:
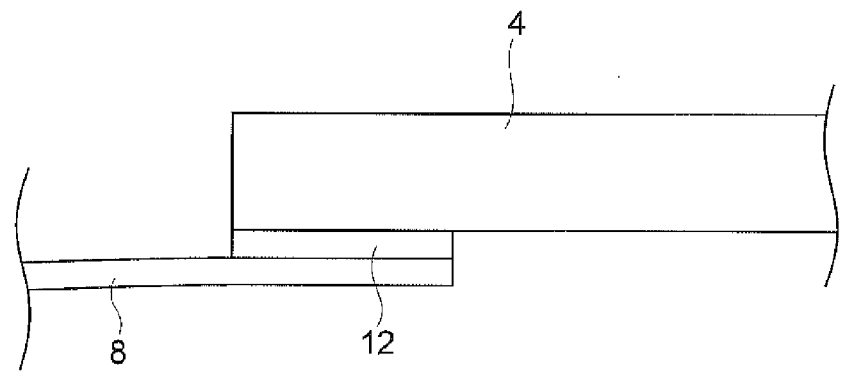
FIG. 17A is a schematic enlarged view that is related to a second aspect of the present invention and that illustrates an arm, a first joint part, and a suspension provided in the magnetic head device illustrated in FIG. 3.
Figure 17B:
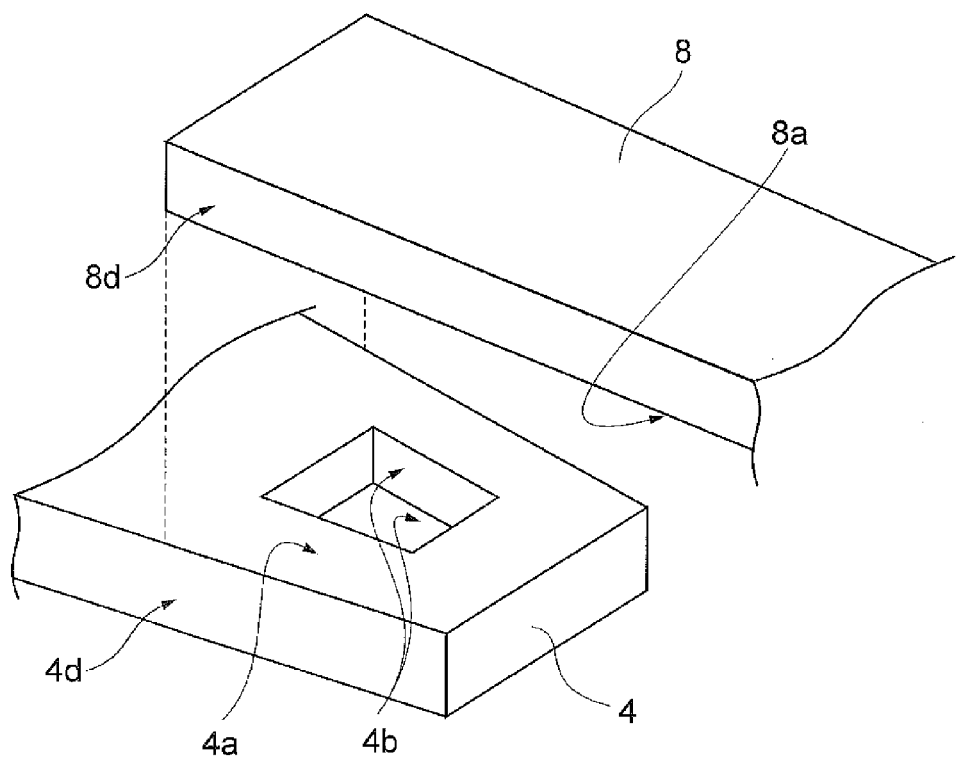
FIG. 17B is a perspective exploded view that is related to the second aspect of the present invention and that illustrates a vicinity of a leading end part of the arm of the magnetic head device illustrated in FIG. 1.
Figure 18A:
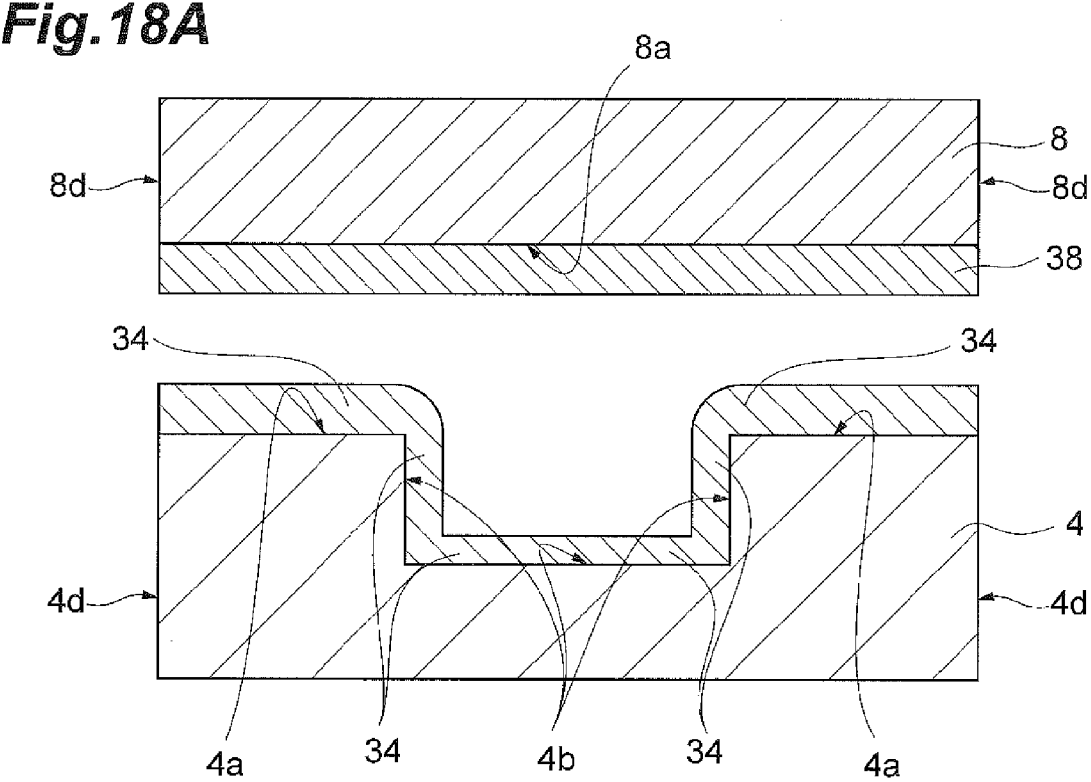
FIG. 18A is a schematic view illustrating a first step in a method of producing a magnetic head device according to the eighth embodiment of the present invention.
Figure 18B:
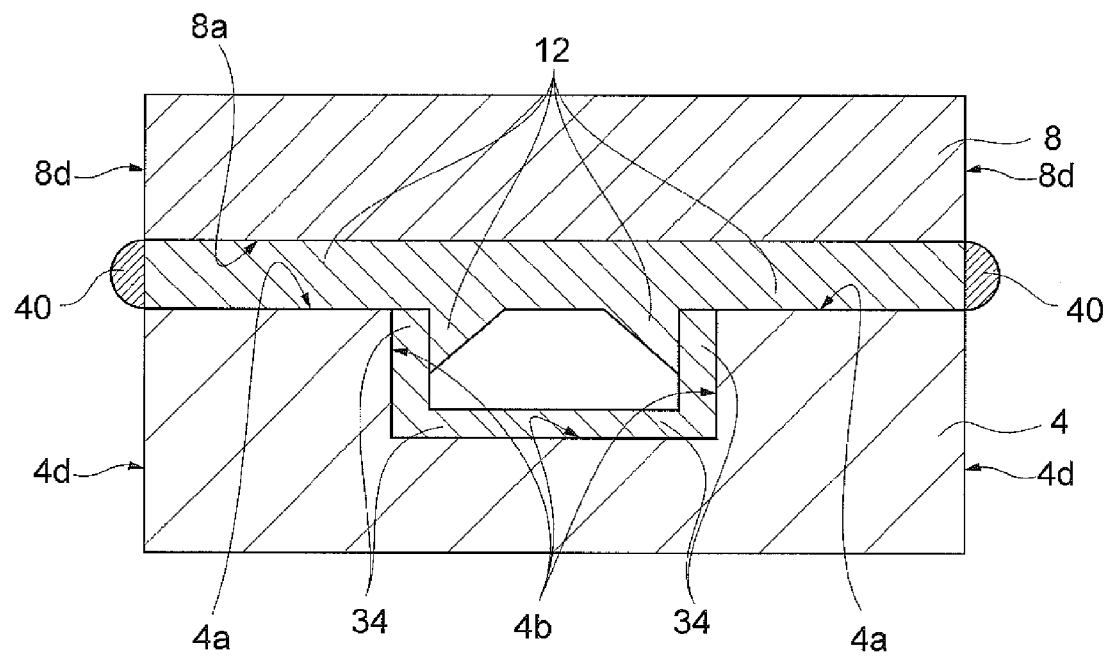
FIG. 18B is a schematic cross sectional view of an arm, a suspension, and a first joint part provided in the magnetic head device produced in the first step illustrated in FIG. 18A.

With reference to FIGS. 17B and 18B, the first joint part 12 will be described in detail. A cross section illustrated in FIG. 18B corresponds to a cross section in direction of a XVIIIb-XVIIIb line in FIG. 1. Each of the cross section illustrated in FIG. 18B and the cross section in the direction of the XVIIIb-XVIIIb line in FIG. 1 is substantially vertical to a longitudinal direction of the arm 4 and a longitudinal direction of the suspension 8. A vertical relationship between the arm 4 and the suspension 8 in FIG. 18B is not necessarily identical to the vertical relationship between the arm 4 and the suspension 8 in the cross section in the direction of the XVIIIb-XVIIIb line in FIG. 1.

As illustrated in FIG. 18B, an arm-side joint surface 4a is defined as a surface of the arm 4 which surface overlaps with the suspension 8. A suspension-side joint surface 8a is defined as a surface of the suspension 8 which surface is overlaps with the arm 4. As illustrated in each of FIG. 17B and FIG. 18B, a first concave portion 4b is formed in the arm-side joint surface 4a between the arm-side joint surface 4a and the suspension-side joint surface 8a. As illustrated in FIG. 18B, a part of a first joint part 12 extends to an inner side of the first concave portion 4b (first joint part 12 is omitted in FIG. 17B for convenience of drawing). The part of the first joint part 12 extends to the inner side of the first concave portion 4*b* can be referred to as a fillet. That is, the fillet that protrudes from between the arm 4 and the suspension 8 extends to the inner side of the first concave portion 4*b*. As described later, the fillet extending to the inner side of the first concave portion 4*b* (part of first joint part 12) does not impair accuracy of a size and a shape of a HSA 2. As illustrated in FIG. 18B, the part of the first joint part 12 is in contact with an arm film 34 that covers a whole inner wall of the first concave portion 4*b*. As described later, the arm film 34 is a film formed on a surface of the arm 4 in a process of producing the HSA 2 (first step). The arm film 34 can be referred to as a precursor of the first joint part 12. As illustrated in FIG. 18B, a part of the inner side of the first concave portion 4*b* may be a space. Note that in the present invention, the first concave portion 4*b* is a space opened on the arm-side joint surface 4*a* or the suspension-side joint surface 8*a* and implies a hole penetrating the arm 4 or the suspension 8.

In an other embodiment, only a part of an inner wall of a first concave portion 4*b* may be covered with an arm film 34. There may be no arm film 34 on an inner side of a first concave portion 4*b* and a part of a first joint part 12 may be directly in contact with a surface of an arm 4 exposed to the inner side of the first concave portion 4*b*. A part of a first joint part 12 extending to an inner side of a first concave portion 4*b* may not be in contact with an inner wall of the first concave portion 4*b*. An inner side of the first concave portion 4*b* may be filled only with a part of a first joint part 12. An inner side of a first concave portion 4*b* may be filled with a part of the first joint part 12 and an arm film 34. A first concave portion may be formed not in an arm-side joint surface 4*a* but in a suspension-side joint surface 8*a* and a part of a first joint part 12 may extend to an inner side of the first concave portion on a side of a suspension. A first concave portion may be formed in each of an arm-side joint surface 4*a* and a suspension-side joint surface 8*a*. A part of a first joint part 12 may extend into the first concave portion on a side of an arm and another part of the first joint part 12 may extend into the first concave portion on a side of a suspension.

The HSA 2 according to an eighth embodiment may be produced by a production method comprising the undermentioned first step and a second step following the first step. In the following, a production method in case of the first joint part 12 includes Sn will be described.

In the first step, at least one of the arm-side joint surface 4*a* and the suspension-side joint surface 8*a* is covered with a Sn elementary substance or a Sn-based alloy. In other words, in the first step, a film including Sn is formed at least on one of the arm-side joint surface 4*a* and the suspension-side joint surface 8*a*. In the first step, at least one of a whole surface of the arm 4 and a whole surface of the suspension 8 may be covered with a Sn elementary substance or a Sn-based alloy. That is, in the first step, the whole surface of the arm 4 may be covered with a film including Sn and the whole surface of the suspension 8 may be covered with a film including Sn. In the following, a film formed on the surface of the arm 4 in the first step will be referred to as an "arm film." Also, a film formed on the surface of the suspensions 8 in the first step will be referred to as a "suspension film." Composition of the first joint part 12 can be controlled, for example, by adjustment of composition of the arm film or the suspension film. At least one of the arm film and the suspension film includes Sn. When there is an arm film including Sn, a suspension film may be absent. When there is a suspension film including Sn, an arm film may be absent. In the first step, the arm film may be formed on the protective layer constituting the surface of the arm 4.

A method of forming the arm film and the suspension film may be, for example, plating, sputtering, or chemical vapor deposition (CVD). The plating may be either one of electrolytic plating or electroless plating. According to these forming methods, it is possible to freely adjust composition and a thickness of each of the arm film and the suspension film. Only a part of the surface of the arm 4 (such as arm-side joint surface 4*a*) may be exposed and the other part thereof may be covered by a masking process performed before the first step. In the first step after the masking process, the arm film may be formed only on the exposed part on the surface of the arm 4 (such as arm-side joint surface 4*a*). Only a part of the surface of the suspension 8 (such as suspension-side joint surface 8*a*) may be exposed and the other part thereof may be covered by a masking process performed before the first step. In the first step after the masking process, the suspension film may be formed only on the exposed part on the surface of the suspension 8 (such as suspension-side joint surface 8*a*). In the masking process, the arm 4 or the suspension 8 may be covered with a resin film. That is, a mask may be a resin film. The resin film used in the masking process is different from the resin adhesive included in the first joint part 12.

As illustrated in FIG. 18A, in a first step of the eighth embodiment, the arm-side joint surface 4*a*, which includes a whole inner wall of the first concave portion 4*b*, among a whole surface of the arm 4 is covered with the arm film 34. Only the arm-side joint surface 4*a* may be covered with the arm film 34. Also, the suspension-side joint surface 8*a* among a whole surface of the suspension 8 is covered with the suspension film 38. Only the suspension-side joint surface 8*a* may be covered with the suspension film 38. In another embodiment, a part of an inner wall of a first concave portion 4*b* may not be covered with an arm film 34 and may be exposed. A whole inner wall of a first concave portion 4*b* may not be covered with the arm film 34 and may be exposed.

In the second step, the arm-side joint surface 4*a* and the suspension-side joint surface 8*a* are overlapped with each other and heated. That is, the arm film 34 and the suspension film 38 are made to come into contact with each other and at least one of the arm film 34 and the suspension film 38 is heated and melted. As a result, the first joint part 12 is formed from at least one of the arm film 34 and the suspension film 38. That is, with the first joint part 12, the arm-side joint surface 4*a* and the suspension-side joint surface 8*a* are joined. The arm-side joint surface 4*a* may be also referred to as a joined surface on a side of the arm 4. The suspension-side joint surface 8*a* may be also referred to as a joined surface on a side of the suspension 8. In a case of performing the masking process before the first step, a process of removing a mask from the arm 4 or the suspension 8 may be performed after the second step.

In a second step, the arm film 34 and the suspension film 38 are melted and a melted metal is generated. The melted metal easily flows. Thus, a part of the melted metal easily protrudes from between the arm 4 and the suspension 8 toward the outside. As illustrated in FIG. 18B, when the melted metal which protrudes from between the arm 4 and the suspension 8 is solidified, a fillet 40 protruded from between the arm 4 and the suspension 8 toward the outside is formed. When the fillet 40 becomes large, accuracy of a size and a shape of the HSA 2 is easily impaired. Also, the fillet 40 may fall out of the HSA 2 and may damage a surface of the magnetic disk 16. However, in the eighth embodiment, a surplus melted metal flows from between the arm 4 and the suspension 8 into the first concave portion 4b and becomes a part of the first joint part 12. Thus, a melted metal that protrudes from between the arm 4 and the suspension 8 toward the outside is reduced and formation or growth of the fillet 40 is suppressed. That is, in the eighth embodiment, a fillet (part of first joint part 12) that does not impair accuracy of a size and a shape of the HSA 2 is formed in the first concave portion 4b. Thus, formation or growth of the fillet 40 that impairs accuracy of a size and a shape of the HSA 2 is suppressed. The fillet 40 illustrated in FIG. 18B is preferably as small as possible. The fillet 40 may be absent.

The arm film 34 has high wettability with respect to a melted metal (affinity with melted metal). This is because composition of the melted metal formed from the arm film 34 and the suspension film 38 is similar or common to composition of the arm film 34. Since a part or a whole of the inner wall of the first concave portion 4b is covered with the arm film 34 in the first step, the melted metal is easily spread to the inner wall of the first concave portion 4b in the second step and a flow of the melted metal into the first concave portion 4b is promoted. As a result, formation or growth of the fillet 40 is easily suppressed.

As described above, as illustrated in FIG. 18A, in the first step in the eighth embodiment, only the arm-side joint surface 4a including the whole inner wall of the first concave portion 4b is covered with the arm film 34 and only the suspension-side joint surface 8a is covered with the suspension film 38. In such a manner, with limitation in a place where the arm film 34 and the suspension film 38 are formed, formation or growth of the fillet 40 is easily suppressed. The reason is as follows.

A surface of the arm 4 (such as Al or $Al_2O_3$) has low wettability compared to the arm film 34 since the surface of the arm 4 has composition different from that of the melted metal. In a case where the surface of the arm 4 is covered with a protective layer consisting of Ni including phosphorus (Ni—P), the protective layer has composition different from that of the melted metal. Thus, the protective layer has low wettability compared to both of the surfaces of the arm film 34 and the arm 4. Since having composition different from that of the melted metal, a surface of the suspension 8 (such as stainless steel or passivation film unique to stainless steel) has low wettability compared to the suspension film 38. Thus, when only the arm-side joint surface 4a is covered with the arm film 34 and only the suspension-side joint surface 8a is covered with the suspension film 38 in the first step, a surface with low wettability with respect to the melted metal is exposed in a place other than a place where the first joint part 12 is formed. Thus, the melted metal is hardly spread to a place other than the first joint part 12 in the second step. As a result, formation or growth of the fillet 40 is easily suppressed.

With the above principle, the HSA 2 in which formation or growth of the fillet 40 is suppressed is obtained. That is, the HSA 2 with high accuracy of a size and a shape is obtainbyed.

A heating method in the second step may be, for example, an atmosphere heating method such as reflow. In the second step, the arm-side joint surface 4a and the suspension-side joint surface 8a are heated, for example, at 150 to 450° C. By the heating in this temperature range, the first joint part 12 is formed easily and joint strength in the arm 4 and the suspension 8 is improved easily. The first joint part 12 may be formed by joining of the arm-side joint surface 4a and the suspension-side joint surface 8a by laser heating. However, it becomes more difficult to accurately irradiate each joint surface with a laser when an interval between suspensions 8 becomes smaller. On the other hand, when the atmosphere heating method is used, heat is easily transmitted to each joint surface in a uniform manner regardless of an interval between the suspensions 8. Thus, unevenness or a variation in joint strength between a plurality of the first joint parts 12 is easily suppressed.

A content of Sn in the first joint part 12 may be, for example, equal to or larger than 40 percent by mass and smaller than 100 percent by mass. In a case where the content of Sn is equal to or larger than 40 percent by mass, joint strength is easily improved. The content of Sn in the first joint part 12 is controlled freely, for example, by an adjustment of a content of Sn in the arm film 34 or the suspension film 38 formed in the first step.

A thickness of the first joint part 12 may be, for example, 2 to 50 μm or 5 to 30 μm. The thickness of the first joint part 12 may be also referred to as a space between the arm 4 and the suspension 8 joined via the first joint part 12. The thickness of the first joint part 12 is controlled freely, for example, by an adjustment of a thickness of the arm film 34 or the suspension film 38 formed in the first step. By control of making the first joint part 12 equal to or thicker than 2 μm, joint strength is improved easily. By control of making the first joint part 12 equal to or thinner than 50 μm, melting and flowing out (that is, bleeding) of a component composing the arm film 34 or the suspension film 38 and formation or growth of the fillet in the second step are easily suppressed.

A thickness of the suspension 8 may be, for example, 0.05 to 0.3 mm. A thickness of the arm 4 may be, for example, 0.3 to 1.0 mm.

A Sn-based alloy used in the first step is, for example, solder or a braze material. The Sn-based alloy may contain at least one kind selected from the group consisting of Ag, Cu, Bi, In, Ni, Zn, P, and Au in addition to Sn. By utilization of the Sn-based alloy containing these elements, the first joint part 12 is formed easily in the second step and joint strength is easily improved. Note that when one of the arm film 34 and the suspension film 38 includes Sn, it is not necessary for the other film to include Sn. For example, when one of the arm film 34 and the suspension film 38 includes Sn, the other film may be a film consisting of at least one kind selected from the group consisting of Ag, Cu, Bi, In, Ni, Zn, P, and Au. That is, the other film may be a film consisting of an element other than Sn. The arm film 34 may be constituted by two overlapped films. One of the films includes Sn and the other does not necessarily include Sn. Similarly, the suspension film 38 may be constituted by two overlapped films.

In the first step, one of the arm-side joint surface 4a and the suspension-side joint surface 8a may be covered with a Sn elementary substance or a Sn-based alloy and the other joint surface may be covered with a metal having a melting point higher than that of the Sn elementary substance or with a metal having a melting point higher than that of the Sn-based alloy. In a case where such a first step is performed, excessive melting and bleeding on each joint surface and formation or growth of a fillet in the second step are easily suppressed. As a result, the first joint part 12 easily becomes thick. The metal having a melting point higher than that of the Sn elementary substance or the Sn-based alloy is, for example, a Ni elementary substance or Ni including P. Thus, in the first step, one joint surface may be covered with a film consisting of the Sn elementary substance or the Sn-based alloy and the other joint surface may be covered with a film consisting of the Ni elementary substance or with a film consisting of Ni including P. The film consisting of Ni including P can be formed, for example, with an electroless nickel plating solution including a phosphorous compound. The phosphorous compound is, for example, hypophosphite such as sodium hypophosphite.

When the first joint part 12 includes a resin adhesive or when the first joint part 12 consists of a resin adhesive, a HSA 2 is produced, for example, by the following production method.

In a first step, at least one of the arm-side joint surface 4a and the suspension-side joint surface 8a may be covered with an uncured resin adhesive. In other words, in the first step, a film including an uncured resin adhesive is formed on at least one joint surface of the arm-side joint surface 4a and the suspension-side joint surface 8a. That is, in the first step, at least one of the arm film 34 or the suspension film 38 is formed of an uncured resin adhesive.

In a second step, the arm-side joint surface 4a and the suspension-side joint surface 8a are made to come into contact with each other and a resin adhesive between the arm 4 and the suspension 8 is cured. For example, when a resin adhesive is a thermosetting type, the arm-side joint surface 4a and the suspension-side joint surface 8a are overlapped with each other and heated. As a result, the resin adhesive is cured and the first joint part 12 is formed.

Even in a case of forming the first joint part 12 with the resin adhesive, the uncured resin adhesive may flow and form a fillet 40 in the second step similarly to the melted metal. However, in the eighth embodiment, a surplus resin adhesive flows from between the arm 4 and the suspension 8 into the first concave portion 4b and becomes a part of the first joint part 12. Thus, a resin adhesive that protrudes from between the arm 4 and the suspension 8 toward the outside is reduced and formation or growth of the fillet 40 is suppressed. That is, even in a case of forming the first joint part 12 with the resin adhesive, formation or growth of the fillet 40 is suppressed according to a mechanism similar to a case of forming the first joint part 12 with a Sn elementary substance or a Sn-based alloy.

As described above, in the eighth embodiment, the first joint part 12 chemically or physically joins the arm 4 and the suspension 8 regardless of whether the first joint part 12 includes Sn or a resin adhesive. Thus, according to the eighth embodiment, joint strength in the arm 4 and the suspension 8 is improved compared to a case where a mechanical joining method such as fitting and joining in a related art is used. Also, in the eighth embodiment, a part of the first joint part 12 is in contact with the inner wall of the first concave portion 4b. Thus, it is possible to increase a contact area of the first joint part 12 with the arm 4 (or suspension 8) compared to a case where there is no first concave portion 4b. Moreover, in the eighth embodiment, the first joint part 12 can be formed by surface contact. Thus, it is not necessary to make the arm 4 and the suspension 8 thick to form a fitting hole. That is, in the eighth embodiment, even when the arm 4 and the suspension 8 are too thin to perform fitting and joining, joint strength is hardly weakened. With these reasons, according to the HSA 2 of the eighth embodiment, it is possible to make the arm 4 and the suspension 8 thin and to increase the number of magnetic disks 16 while securing the joint strength. As a result, it is possible to realize a magnetic disk device 18 with high reliability and a large capacity compared to a related art.

In the first step of the eighth embodiment, a basis material of the arm 4 may be exposed on a surface adjacent to the arm-side joint surface 4a (side surface 4d of arm 4). The basis material of the arm 4 with low wettability with respect to a melted metal or uncured resin adhesive is exposed on the side surface 4d, whereby a melted metal or an uncured resin adhesive is hardly spread on the side surface 4d in the second step. As a result, formation or growth of a fillet 40 on the side surface 4d of the arm 4 is easily suppressed. Note that in the first step of the eighth embodiment, a rear surface of the arm-side joint surface 4a may be covered with an arm film or an uncured resin adhesive. The rear surface of the arm-side joint surface 4a may not be covered with the arm film or the uncured resin adhesive.

In the first step of the eighth embodiment, a protective layer covering the basis material of the arm 4 may be exposed on a surface adjacent to the arm-side joint surface 4a (side surface 4d of arm 4). The protective layer includes Ni and P. Similarly to the basis material of the arm 4, wettability of the protective layer is low. With the above principle, formation or growth of the fillet 40 on the side surface 4d of the arm 4 is easily suppressed. When the HSA 2 is finished, the protective layer covering the basis material of the arm 4 may be exposed on the surface (side surface 4d of arm 4) adjacent to the arm-side joint surface 4a.

In the first step of the eighth embodiment, a basis material of the suspension 8 may be exposed on a surface (side surface 8d of suspension) adjacent to the suspension-side joint surface 8a. The basis material of the suspension 8 with low wettability with respect to a melted metal or an uncured resin adhesive is exposed on the side surface 8d, whereby the melted metal or the uncured resin adhesive is hardly spread on the side surface 8d in the second step. As a result, formation or growth of a fillet 40 on the side surface 8d of the suspension 8 is easily suppressed. Note that in the first step of the eighth embodiment, a rear surface of the suspension-side joint surface 8a may be covered with a suspension film or an uncured resin adhesive. The rear surface of the suspension-side joint surface 8a may not be covered with the suspension film or the uncured resin adhesive.

In the above, the magnetic head device (HSA 2) according to the eighth embodiment of the present invention has been described. However, the second aspect of the present invention is not limited to the eighth embodiment. Even in each of other embodiments described in the following, a magnetic head device that has high joint strength in an arm and a suspension and high accuracy of a size and a shape is provided according to a mechanism similar to that of the eighth embodiment. In the following, only differences between the eighth embodiment and the other embodiments will be described and a description of a point common in the eighth embodiment and the other embodiments will be omitted.

Figure 19A:
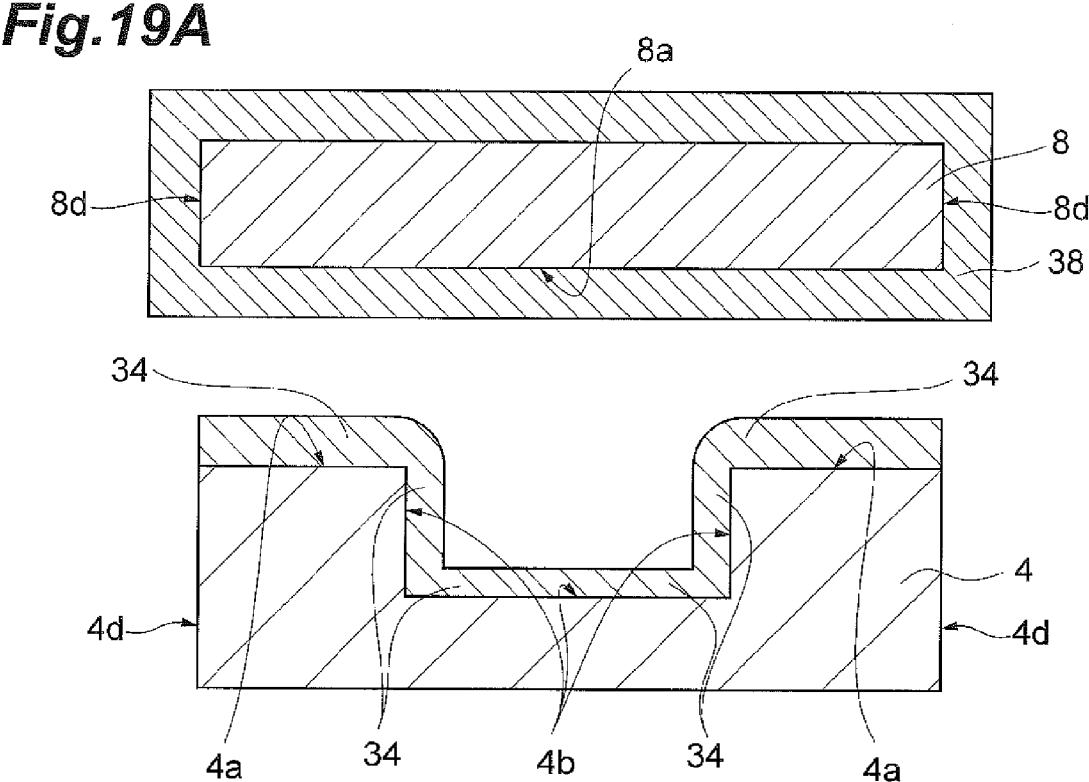
FIG. 19A is a schematic view illustrating a first step in a method of producing a magnetic head device according to a ninth embodiment of the present invention.
Figure 19B:
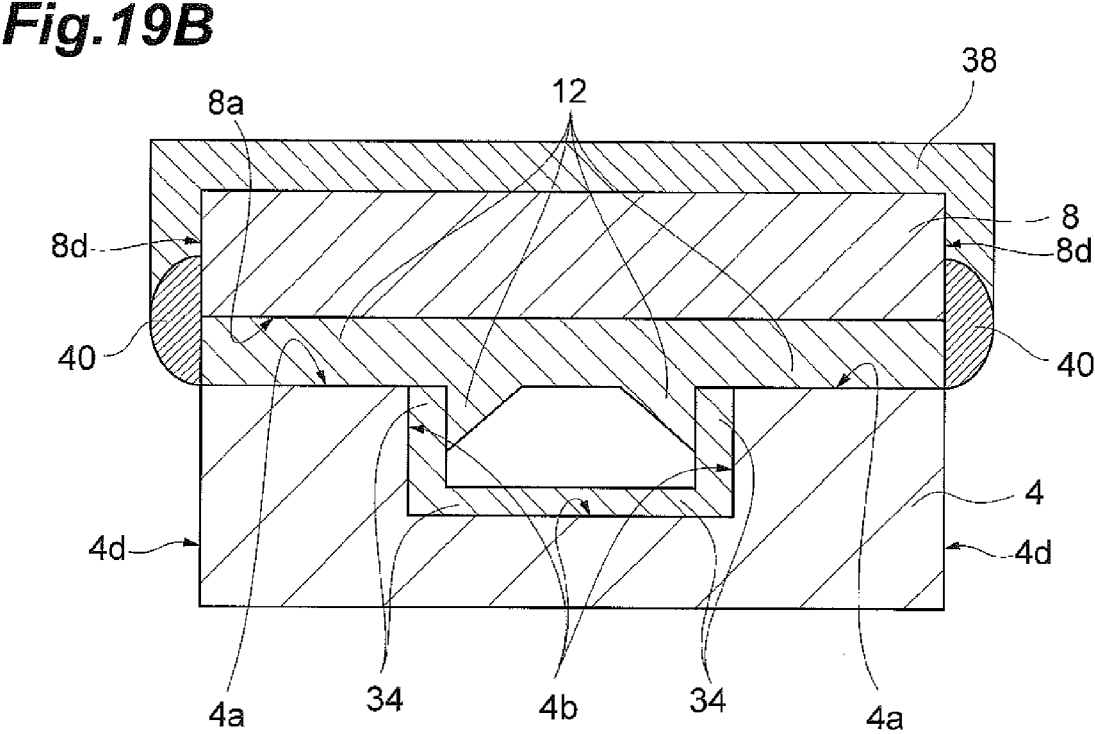
FIG. 19B is a schematic cross sectional view of an arm, a suspension, and a first joint part provided in the magnetic head device produced in the first step illustrated in FIG. 19A.
Figure 20A:
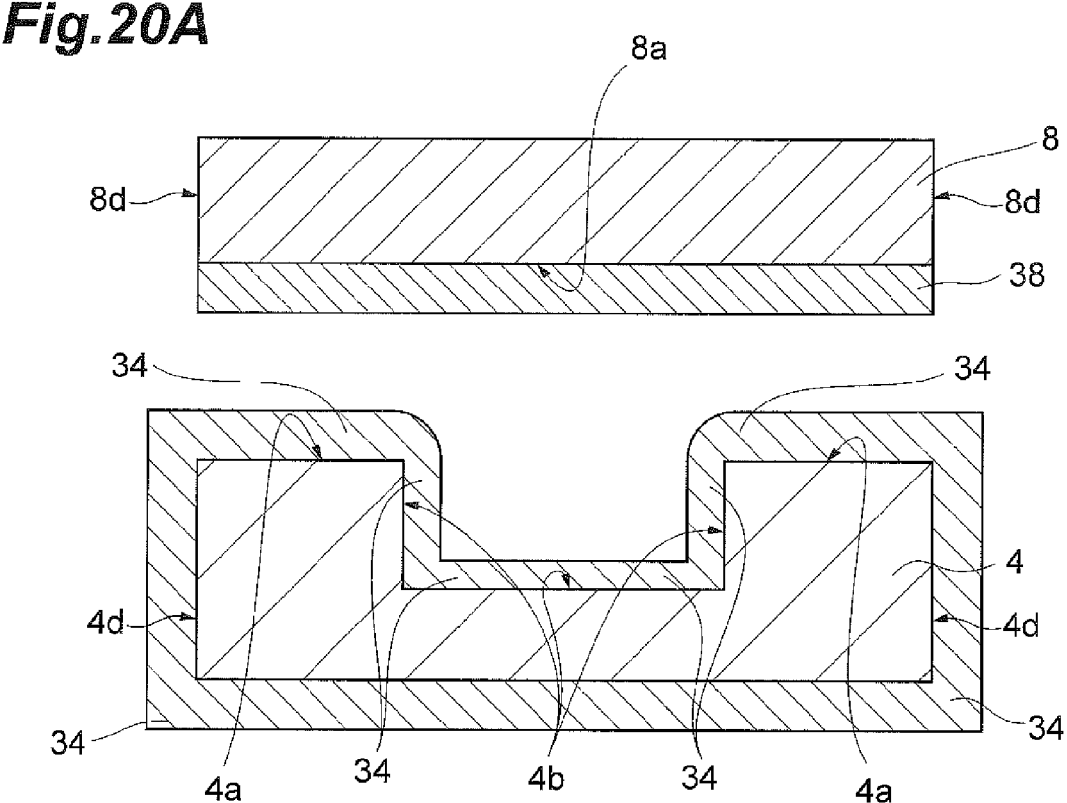
FIG. 20A is a schematic view illustrating a first step in a method of producing a magnetic head device according to a tenth embodiment of the present invention.
Figure 20B:
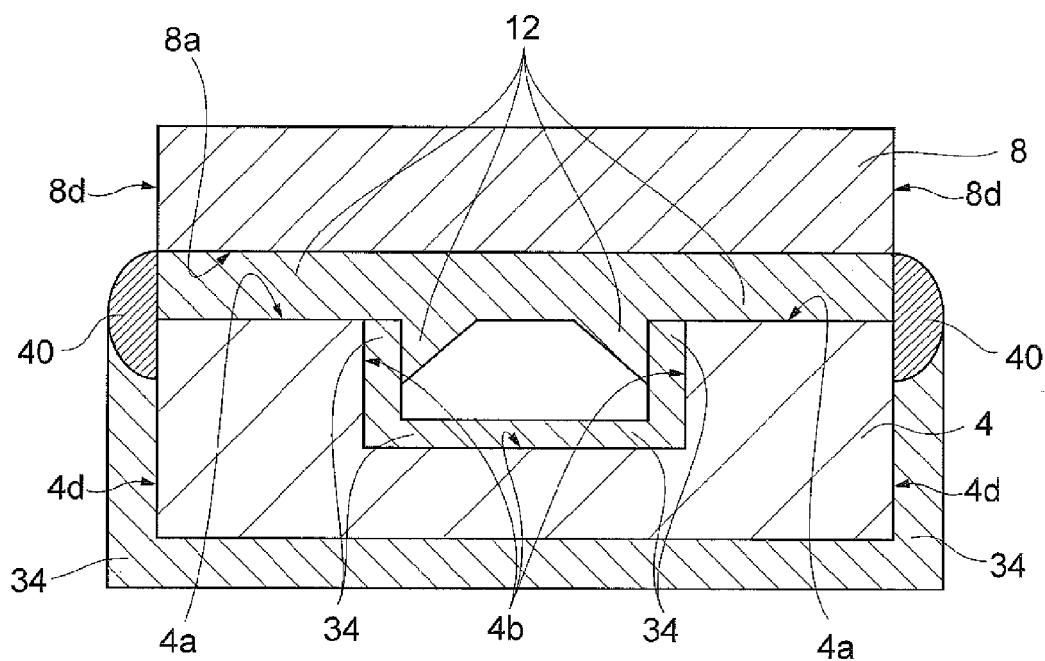
FIG. 20B is a schematic cross sectional view of an arm, a suspension, and a first joint part provided in the magnetic head device produced in the first step illustrated in FIG. 20A.
Figure 21A:
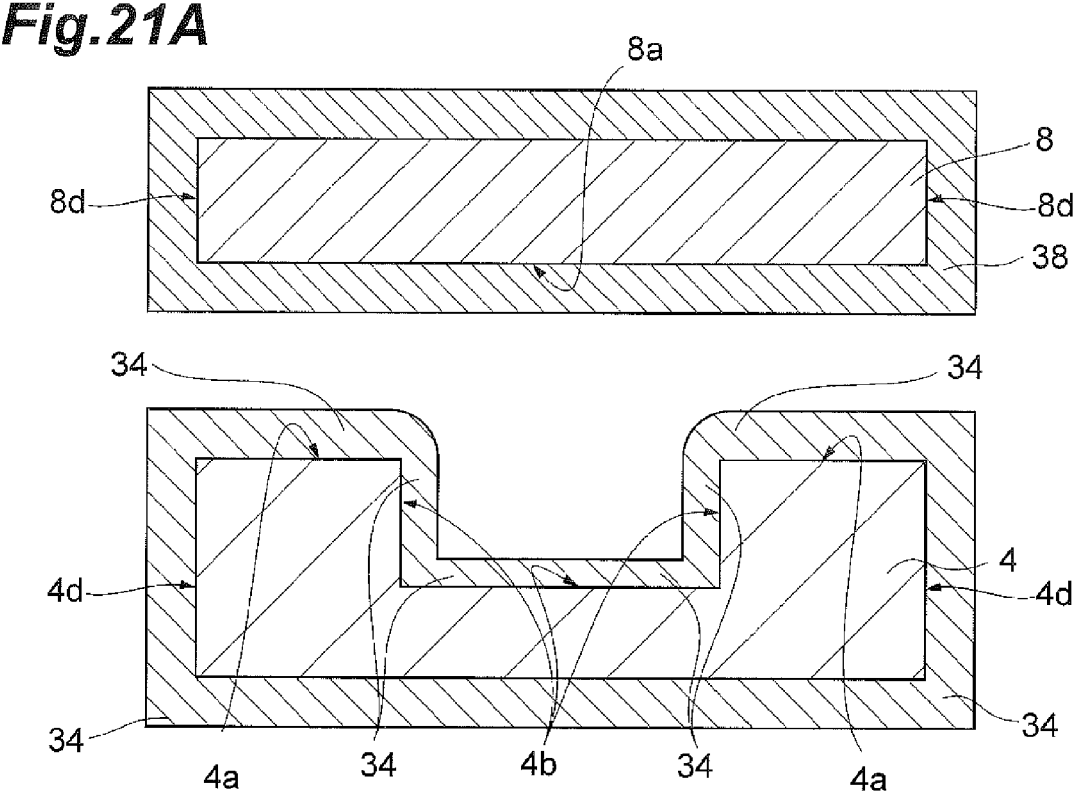
FIG. 21A is a schematic view illustrating a first step in a method of producing a magnetic head device according to an eleventh embodiment of the present invention.

FIG. 19A, FIG. 20A, and FIG. 21A described in the following are views illustrating arms 4 and suspensions 8 processed in first steps in other embodiments. A cross section illustrated in each of FIG. 19A, FIG. 19B, FIG. 20A, FIG. 20B, FIG. 21A, FIG. 21B, FIG. 22B, and FIG. 23 is substantially vertical to a longitudinal direction of an arm 4, an arm-side joint surface 4a, a longitudinal direction of a suspension 8, and a suspension-side joint surface 8a.

(Ninth Embodiment)

As illustrated in FIG. 19A, in a first step of the ninth embodiment, only an arm-side joint surface 4a including a whole inner wall of a first concave portion 4b is covered with an arm film 34 and a whole surface of a suspension 8 is covered with a suspension film 38. In the following second step, a melted metal is easily spread to the surface of the suspension 8 covered with the suspension film 38. However, the melted metal is hardly spread to an exposed surface of an arm 4 (side surface 4d of arm 4 basis material or protective layer of which is exposed). Thus, as illustrated in FIG. 19B, formation or growth of a fillet 40 specifically on the surface of the arm 4 (side surface 4d of arm 4) is easily suppressed.

(Tenth Embodiment)

As illustrated in FIG. 20A, in a first step of the tenth embodiment, a whole surface of an arm 4 including a whole inner wall of a first concave portion 4b is covered with an arm film 34 and only a suspension-side joint surface 8a is covered with a suspension film 38. In the following second step, a melted metal is easily spread to the surface of the arm 4 covered with the arm film 34 but is hardly spread to an exposed surface of a suspension 8 (side surface 8d of suspension 8 surface basis material of which is exposed). Thus, as illustrated in FIG. 20B, formation or growth of a fillet 40 specifically on the surface of the suspension 8 (side surface 8d of suspension 8) is easily suppressed.

(Eleventh Embodiment)

Figure 21B:
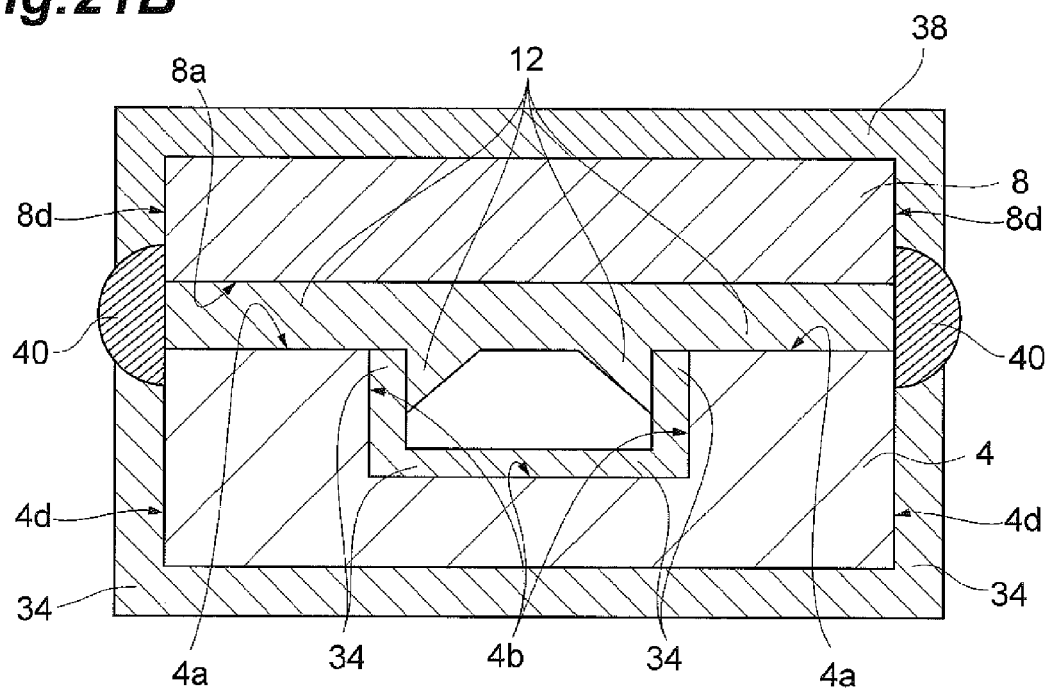
FIG. 21B is a schematic cross sectional view of an arm, a suspension, and a first joint part provided in the magnetic head device produced in the first step illustrated in FIG. 21A.

As illustrated in FIG. 21A, in a first step of the eleventh embodiment, a whole surface of an arm 4 including a whole inner wall of a first concave portion 4b is covered with an arm film 34 and a whole surface of a suspension 8 is covered with a suspension film 38. In the following second step, the melted metal is easily spread to a part other than a first joint part 12 through surfaces of the arm film 34 and suspension film 38 having wettability. Thus, a fillet 40 is easily formed in the eleventh embodiment compared to the above embodiments. In the eleventh embodiment, as illustrated in FIG. 21B, a fillet 40 spread to both of the surface of the arm 4 and the surface of the suspension 8 may be formed. However, even in the eleventh embodiment, formation or growth of the fillet 40 is suppressed compared to a case where the first concave portion 4b is not formed on the arm-side joint surface 4a.

(Twelfth Embodiment)

In a HSA according to the twelfth embodiment, a suspension includes a spacer, a load beam, and a flexure. That is, the suspension is constituted by a spacer, a load beam, and a flexure.

Figure 22A:
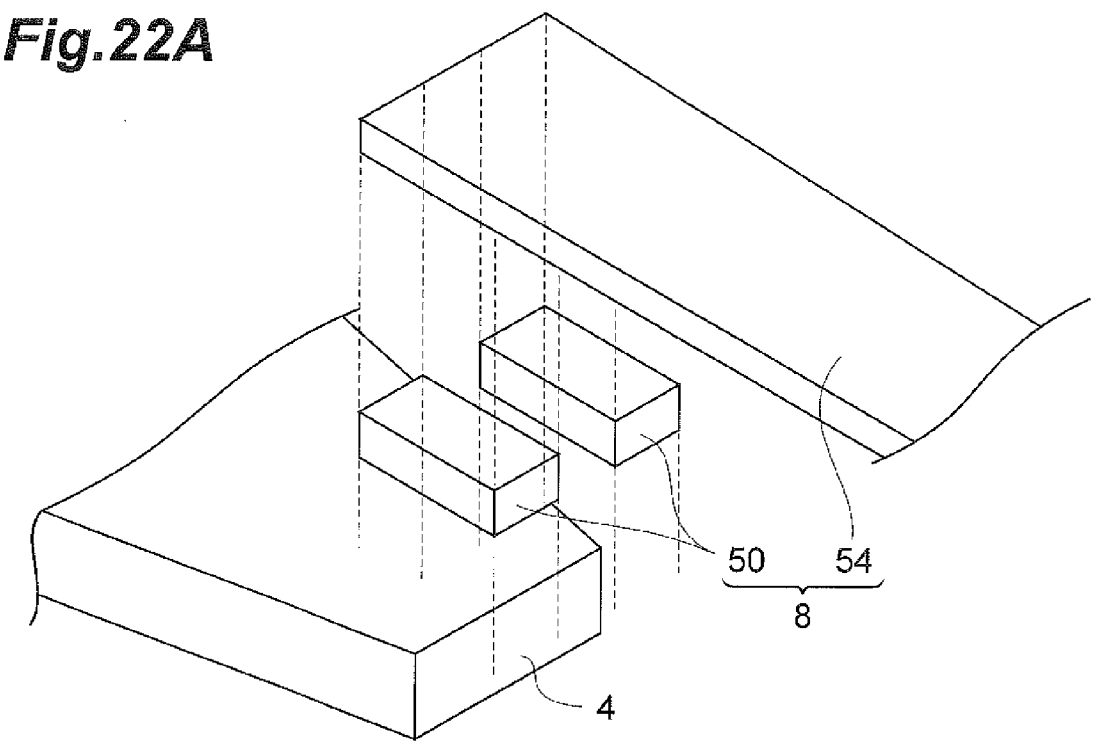
FIG. 22A is a perspective exploded view illustrating a vicinity of a leading end part of an arm of a magnetic head device according to a twelfth embodiment of the present invention.
Figure 22B:
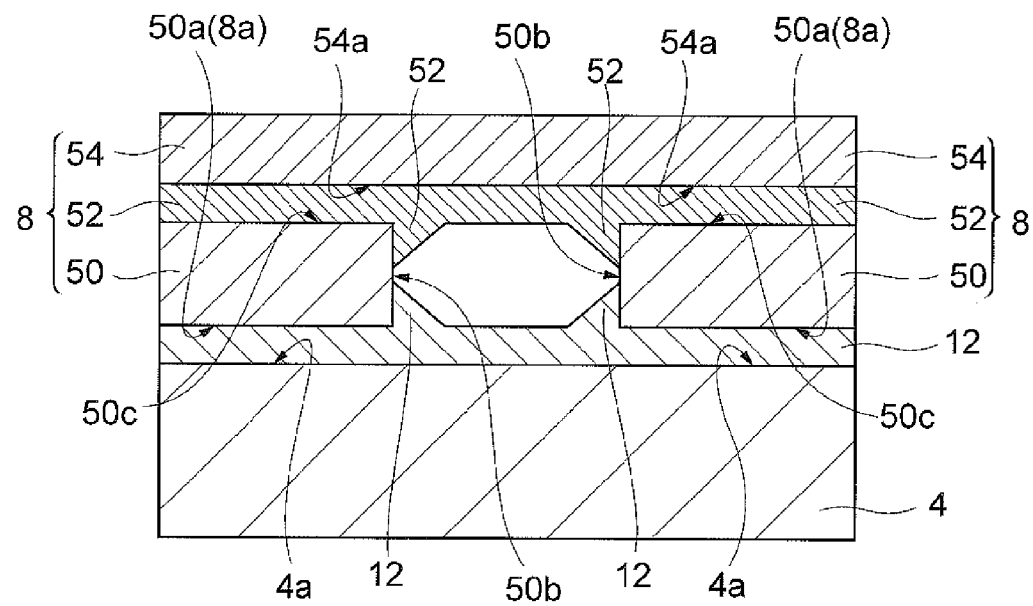
FIG. 22B is a schematic cross sectional view of the arm, a first joint part, a spacer, a second joint part, and a load beam provided in the magnetic head device according to the twelfth embodiment of the present invention.

As illustrated in FIG. 22A and FIG. 22B, in the twelfth embodiment, a pair of spacers 50 provided in a suspension 8 overlaps with a leading end part of an arm 4. A first joint part 12 is located between the leading end part of the arm 4 and the spacers 50 (first joint part 12 is omitted in FIG. 22A for convenience of drawing). That is, the first joint part 12 joins the arm 4 and a part of the suspension 8 (pair of spacers 50). One leading end part of the load beam 54 overlaps with the pair of spacers 50. A second joint part 52 is located between the spacers 50 and the load beam 54 and joins the spacers 50 and the load beam 54 (second joint part 52 is omitted in FIG. 22A for convenience of drawing). Similarly to the first joint part 12, the second joint part 52 includes Sn or a resin adhesive. A flexure is provided to the other leading end part of the load beam 54 and a slider 10 is located on a surface of the flexure, although it is not illustrated.

As illustrated in FIG. 22B, a space (concave portion 50b) is formed between the pair of spacers 50. Since the pair of spacers 50 is a part of the suspension 8, a surface 50a of each spacer 50 overlapping with an arm-side joint surface 4a can be referred to as a suspension-side joint surface 8a. Thus, the concave portion 50b formed between the pair of spacers 50 can be also referred to as a first concave portion formed on the suspension-side joint surface 8a. That is, in the twelfth embodiment, the first concave portion (concave portion 50b) is formed on the suspension-side joint surface 8a between the arm-side joint surface 4a and the suspension-side joint surface 8a. Then, a part of the first joint part 12 extends to an inner side of the first concave portion (concave portion 50b).

In the twelfth embodiment, as illustrated in FIG. 22B, a spacer-side joint surface 50c is defined as a part of a surface of each spacer 50 which part overlaps with the load beam 54. A load beam-side joint surface 54a is defined as a part of a surface of the load beam 54 which part overlaps with each spacer 50. The concave portion 50b can be referred to as a second concave portion formed in the spacer-side joint surface 50c. Thus, in the twelfth embodiment, the second concave portion (concave portion 50b) is formed in the spacer-side joint surface 50c between the spacer-side joint surface 50c and the load beam-side joint surface 54a. A part of the second joint part 52 extends into the second concave portion (concave portion 50b). A part of the second joint part 52 is in contact with an inner wall of the second concave portion (concave portion 50b). Note that in the present invention, a second concave portion is a space opened on the spacer-side joint surface 50c or the load beam-side joint surface 54a and implies a hole that penetrates the spacer 50 or the load beam 54.

As described above, in the twelfth embodiment, the concave portion 50b is both of the first concave portion and the second concave portion.

In another embodiment, a second concave portion may be formed in a load beam-side joint surface and a part of a second joint part may extend into the second concave portion on a side of a load beam. A second concave portion may be formed in both of a spacer-side joint surface and a load beam-side joint surface. A part of a second joint part may extend into a second concave portion on a side of a spacer and a different part of the second joint part may extend to an inner side of a first concave portion on a side of a load beam.

In a case where a second joint part 52 includes Sn, a HSA is produced by the following production method. First, similarly to the above first step, at least one of a spacer-side joint surface 50c and a load beam-side joint surface 54a is covered with a Sn elementary substance or a Sn-based alloy. Then, similarly to the above second step, the spacer-side joint surface 50c and the load beam-side joint surface 54a are overlapped with each other and heated, whereby the Sn elementary substance or the Sn-based alloy is melted and a second joint part 52 is formed. In other words, a suspension 8 (load beam 54 to which spacer 50 is joined) is formed. Subsequently, by performance of the above first step and second step, a spacer 50 that is a part of the suspension 8 is joined to an arm 4 via a first joint part 12.

When the second joint part 52 includes a resin adhesive or when the second joint part 52 consists of a resin adhesive, a HSA is produced, for example, by the following production method. First, similarly to the above first step, at least one of a spacer-side joint surface 50c and a load beam-side joint surface 54a is covered with an uncured resin adhesive. Subsequently, similarly to the above second step, the spacer-side joint surface 50c is made to come into contact with the load beam-side joint surface 54a and the resin adhesive between the spacer 50 and the load beam 54 is cured. For example, when the resin adhesive is a thermosetting type, the spacer-side joint surface 50c and the load beam-side joint surface 54a are overlapped with each other and heated. As a result, the resin adhesive is cured and the second joint part 52 is formed.

In the twelfth embodiment, similarly to a case of the first joint part 12, a melted metal or a uncured resin adhesive easily protrudes from between the spacer 50 and the load beam 54 toward the outside in a process of forming the second joint part 52. When the melted metal which protrudes from between the spacer 50 and the load beam 54 toward the outside is solidified, a fillet protruded from between the spacer 50 and the load beam 54 is formed. However, in the twelfth embodiment, a surplus melted metal or resin adhesive flows from between the spacer 50 and the load beam 54 into the second concave portion (concave portion 50b) and becomes a part of the second joint part 52. Thus, a melted metal or a resin adhesive that protrudes from between the spacer 50 and the load beam 54 is reduced and formation or growth of a fillet is suppressed.

In the twelfth embodiment, the second joint part 52 chemically or physically joins the spacer 50 and the load beam 54. Thus, joint strength in the spacer 50 and the load beam 54 is improved compared to a case where a mechanical joining method such as fitting and joining in a related art is used. Also, in the twelfth embodiment, a part of the second joint part 52 is in contact with an inner wall of the second concave portion (concave portion 50b). Thus, it is possible to increase a contact area of the second joint part 52 with the spacer 50 (or load beam 54) compared to a case where there is no second concave portion (concave portion 50b). Moreover, the second joint part 52 can be formed by surface contact. Thus, it is not necessary to make the spacer 50 and the load beam 54 thick to form a fitting hole. That is, even in a case where the spacer 50 and the load beam 54 are too thin and fitting and joining cannot be performed, joint strength in the spacer 50 and the load beam 54 is hardly weakened.

(Thirteenth Embodiment)

Figure 23:
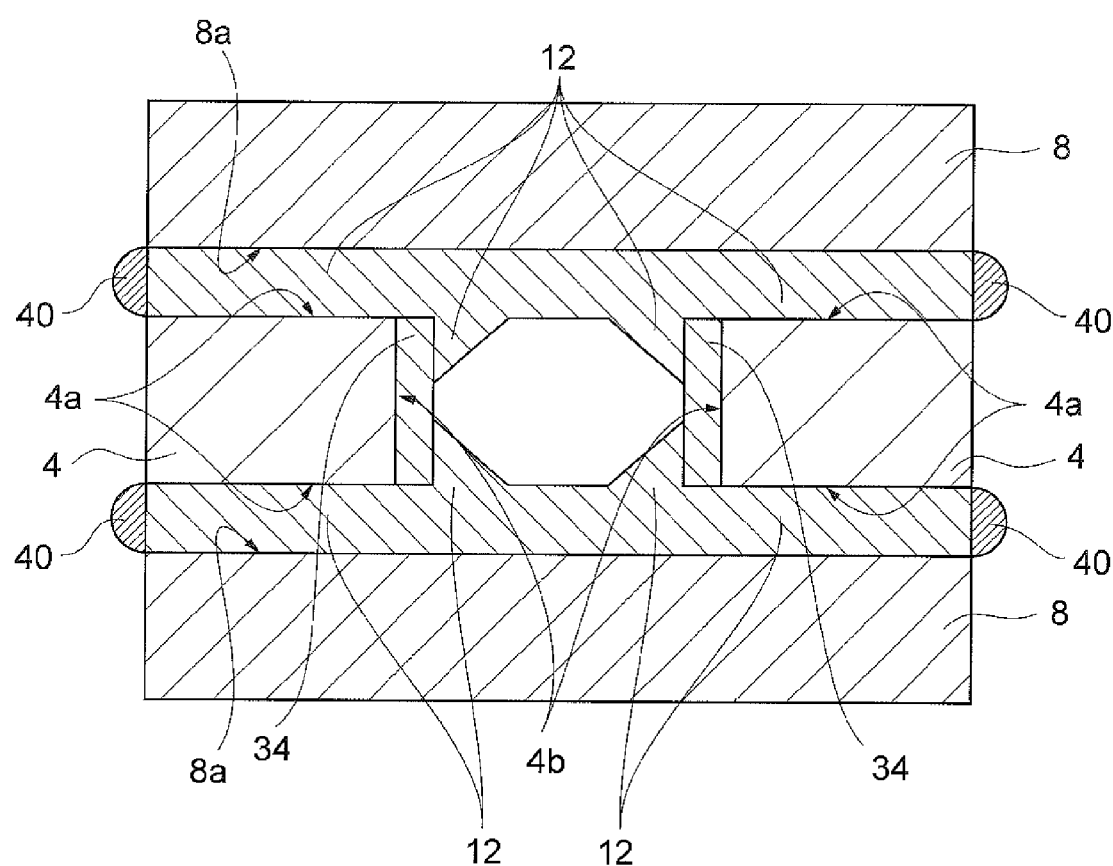
FIG. 23 is a schematic cross sectional view of an arm, a suspension, and a first joint part provided in a magnetic head device according to a thirteenth embodiment of the present invention.

In the thirteenth embodiment, as illustrated in FIG. 23, a first concave portion 4b penetrates an arm 4. One suspension 8 is joined to one arm-side joint surface 4a by one first joint part 12. Another suspension 8 is joined to another arm-side joint surface 4a by another first joint part 12. That is, a pair of first joint parts 12 sandwiches one arm 4 and a pair of suspensions 8 sandwiches a pair of first joint parts 12. A part of each first joint part 12 extends into the first concave portion 4b that penetrates the arm 4 and is in contact with an inner wall of the first concave portion 4b.

(Modification Example of Eighth to Thirteenth Embodiments)

The number of first concave portions is one or more. The number of second concave portions is in a similar manner. A shape inside a first concave portion is not specifically limited and may be, for example, a cube, rectangular parallelepiped, cylinder, polygonal column, inverted cone, inverted polygonal pyramid, wedge shape, or curved shape (such as recessed shape or hemisphere shape). A shape inside the second concave portion is in a similar manner.

A magnetic head device may be a head arm assembly (HAA) comprising an arm 4, a suspension 8 overlapping with a leading end part of the arm 4, a slider 10 located at a leading end part of the suspension 8, and a first joint part 12 that is located between the leading end part of the arm 4 and the suspension 8 and that joins the arm 4 and the suspension 8, the first joint part 12 including Sn.

A spacer 50 and a load beam 54 may be welded directly, for example, by spot welding. In this case, a second joint part 52 is not necessarily formed between the spacer 50 and the load beam 54.

Reference Signs List in FIGS. 1 to 3 and FIGS. 17A to 23

2 . . . HSA (magnetic head device), 4 . . . arm, 4a . . . arm-side joint surface, 4b . . . first concave portion, 6 . . . carriage, 8 . . . suspension, 8a . . . suspension-side joint surface, 10 . . . slider, 11 . . . HGA, 12 . . . first joint part, 14 . . . coil part, 16 . . . magnetic disk, 18 . . . magnetic disk device, 20 . . . spindle motor, 22 . . . permanent magnet, 34 . . . arm film, 38 . . . suspension film, 40 . . . fillet, 50 . . . spacer, 50b . . . second concave portion, 50c . . . spacer-side joint surface, 52 . . . second joint part, 54 . . . load beam, 54a . . . load beam-side joint surface

What is claimed is:

1. A magnetic head device comprising:
an arm;
a suspension overlapping with a leading end part of the arm;
a slider located at a leading end part of the suspension; and
a first joint part that located between the leading end part of the arm and the suspension and that joins the arm and the suspension;
wherein the first joint part includes Sn or a resin adhesive,
an arm-side joint surface is defined as a surface of the arm which surface faces the suspension,
a suspension-side joint surface is defined as a surface of the suspension which surface faces the arm,
at least one of the arm-side joint surface and the suspension-side joint surface includes a first overlapped region that overlaps with the other joint surface and a first non-overlapped region that does not overlap with the other joint surface,
the first joint part is in contact with both of the arm and the suspension in the first overlapped region, and
a part of the first joint part extends to at least a part of the first non-overlapped region,
wherein the suspension includes
a spacer that overlaps with the leading end part of the arm and that is joined to the arm by the first joint part,
a load beam, one leading end part of which overlaps with the spacer and the slider is located at the other leading end part of which, and
a second joint part that is located between the spacer and the load beam and that joins the spacer and the load beam, and
wherein the second joint part includes Sn or a resin adhesive,
a spacer-side joint surface is defined as a surface of the spacer which surface faces the load beam,
a load beam-side joint surface is defined as a surface of the load beam which surface faces the spacer,
at least one of the spacer-side joint surface and the load beam-side joint surface includes a second overlapped region that overlaps with the other joint surface and a second non-overlapped region that does not overlap with the other joint surface, and
the second joint part is in contact with both of the spacer and the load beam in the second overlapped region, and
a part of the joint part extends to at least a part of the second non-overlapped region.

2. The magnetic head device according to claim 1,
wherein the first joint part includes an alloy containing Sn, and
the alloy contains at least one kind selected from the group consisting of Ag, Cu, Bi, In, Ni, Zn, P, and Au.

3. The magnetic head device according to claim 1,
wherein the second joint part includes an alloy containing Sn, and
the alloy contains at least one kind selected from the group consisting of Ag, Cu, Bi, In, Ni, Zn, P, and Au.

4. The magnetic head device according to claim 1, further comprising a carriage having a plurality of arms.

* * * * *